US005965235A

United States Patent [19]
McGuire et al.

[11] Patent Number: 5,965,235
[45] Date of Patent: Oct. 12, 1999

[54] THREE-DIMENSIONAL, AMORPHOUS-PATTERNED, NESTING-RESISTANT SHEET MATERIALS AND METHOD AND APPARATUS FOR MAKING SAME

[75] Inventors: Kenneth Stephen McGuire, Wyoming; Richard Tweddell, III; Peter Worthington Hamilton, both of Cincinnati, all of Ohio

[73] Assignee: The Procter & Gamble Co., Cincinnati, Ohio

[21] Appl. No.: 08/745,339

[22] Filed: Nov. 8, 1996

[51] Int. Cl.$^6$ .................................. B32B 3/00; B31F 1/22
[52] U.S. Cl. ...................... 428/156; 428/141; 428/343; 428/409; 428/172; 474/237; 156/209; 156/295; 264/167; 264/293; 345/430
[58] Field of Search .................................. 428/156, 167, 428/141, 172, 343, 409; 156/209, 137, 140, 242, 295; 345/419, 430, 441; 264/167, 171.1, 241, 293; 474/237

[56] References Cited

U.S. PATENT DOCUMENTS

| | | | |
|---|---|---|---|
| D. 331,665 | 12/1992 | Underhill | D5/53 |
| D. 373,026 | 8/1996 | Delebreau et al. | D5/20 |

(List continued on next page.)

FOREIGN PATENT DOCUMENTS

| | | | |
|---|---|---|---|
| 570960 | 12/1961 | Belgium. | |
| 0 037 101 A1 | 10/1981 | European Pat. Off. | B65D 77/20 |

(List continued on next page.)

OTHER PUBLICATIONS

Broughton, J., et al., "Porous Cellular Ceramic Membranes: A Stochastic Model To Describe the Structure of an Anodic Oxide Membrane", *Journal of Membrane Science* 106, pp. 89–101 (1995).

(List continued on next page.)

*Primary Examiner*—Donald Loney
*Attorney, Agent, or Firm*—William Scott Andes

[57] ABSTRACT

The present invention relates three-dimensional sheet materials which resist nesting of superimposed layers into one another. More particularly, the present invention provides a three-dimensional, nesting-resistant sheet material having a first side and a second side. The first side comprises at least one region having a plurality of spaced three-dimensional protrusions extending outwardly from the first side which are preferably unitarily formed from the sheet material. To provide the nesting-resistant advantages of the present invention, the protrusions form an amorphous pattern of a plurality of different two-dimensional geometrical shapes. Preferably, the second side comprises a plurality of spaced, three-dimensional hollow depressions corresponding to the protrusions, such that the protrusions are hollow. Of particular interest for certain applications, such as a carrier for an adhesive, the protrusions are separated by an interconnected network of three-dimensional spaces between adjacent protrusions. The three-dimensional, nesting-resistant sheet materials are preferably manufactured in accordance with the present invention utilizing a three-dimensional forming structure comprising an amorphous pattern of spaced three-dimensional recesses separated by interconnected lands. The recesses form an amorphous two-dimensional pattern of interlocking two-dimensional geometrical shapes. The amorphous pattern of interlocking shapes is preferably derived from a constrained Voronoi tessellation of 2-space in accordance with the present invention, wherein the tessellation is constrained by a constraint factor which controls the range of permissible center-to-center spacing of the interlocking shapes. To manufacture the three-dimensional, nesting-resistant sheet materials in accordance with the present invention, a sheet of deformable material is introduced onto the forming structure and permanently deformed into compliance with the forming structure. If desired, the interconnected lands of the forming structure may be coated.

40 Claims, 11 Drawing Sheets

U.S. PATENT DOCUMENTS

| | | | |
|---|---|---|---|
| D. 381,810 | 8/1997 | Schultz et al. | D5/37 |
| 2,338,749 | 1/1944 | Wilbur | 24/67 |
| 2,861,006 | 11/1958 | Salditt | 117/7 |
| 3,312,005 | 4/1967 | McElroy | 40/2 |
| 3,386,846 | 6/1968 | Lones | 117/11 |
| 3,554,835 | 1/1971 | Morgan | 156/234 |
| 3,592,722 | 7/1971 | Morgan | 161/148 |
| 3,853,129 | 12/1974 | Kozak | 128/287 |
| 3,879,330 | 4/1975 | Lustig | 260/31.8 M |
| 3,901,237 | 8/1975 | Cepuritis et al. | 128/284 |
| 3,937,221 | 2/1976 | Tritsch | 128/287 |
| 3,943,609 | 3/1976 | Egan, Jr. | 24/73 |
| 3,967,624 | 7/1976 | Milnamow | 128/287 |
| 4,023,570 | 5/1977 | Chinai et al. | 128/290 R |
| 4,054,697 | 10/1977 | Reed et al. | 428/40 |
| 4,061,820 | 12/1977 | Magid et al. | 428/311 |
| 4,067,337 | 1/1978 | Ness | 128/287 |
| 4,133,152 | 1/1979 | Penrose | 52/105 |
| 4,181,752 | 1/1980 | Martens et al. | 427/54.1 |
| 4,273,889 | 6/1981 | Yamazaki et al. | 525/109 |
| 4,303,485 | 12/1981 | Levens | 204/159.24 |
| 4,336,804 | 6/1982 | Roeder | 128/290 R |
| 4,337,772 | 7/1982 | Roeder | 128/290 R |
| 4,339,088 | 7/1982 | Niedermeyer | 242/1 |
| 4,342,314 | 8/1982 | Radel et al. | 128/287 |
| 4,376,440 | 3/1983 | Whitehead et al. | 604/387 |
| 4,392,897 | 7/1983 | Herrington | 156/66 |
| 4,397,905 | 8/1983 | Dettmer et al. | 428/180 |
| 4,404,242 | 9/1983 | Squier | 428/35 |
| 4,405,666 | 9/1983 | Squier | 428/35 |
| 4,410,130 | 10/1983 | Herrington | 383/62 |
| 4,460,634 | 7/1984 | Hasegawa | 428/124 |
| 4,508,256 | 4/1985 | Radel et al. | 228/152 |
| 4,509,908 | 4/1985 | Mullane, Jr. | 425/290 |
| 4,514,345 | 4/1985 | Johnson et al. | 264/22 |
| 4,519,095 | 5/1985 | Clayton | 383/86 |
| 4,528,239 | 7/1985 | Trokhan | 428/247 |
| 4,546,029 | 10/1985 | Cancio et al. | 428/141 |
| 4,556,595 | 12/1985 | Ochi | 428/143 |
| 4,576,850 | 3/1986 | Martens | 428/156 |
| 4,578,069 | 3/1986 | Whitehead et al. | 604/370 |
| 4,587,152 | 5/1986 | Gleichenhagen et al. | 428/195 |
| 4,612,221 | 9/1986 | Biel et al. | 428/35 |
| 4,655,761 | 4/1987 | Grube et al. | 604/389 |
| 4,659,608 | 4/1987 | Schulz | 428/171 |
| 4,695,422 | 9/1987 | Curro et al. | 264/504 |
| 4,699,622 | 10/1987 | Toussant et al. | 604/389 |
| 4,743,242 | 5/1988 | Grube et al. | 604/389 |
| 4,778,644 | 10/1988 | Curro et al. | 264/557 |
| 4,803,032 | 2/1989 | Schulz | 264/284 |
| 4,820,589 | 4/1989 | Dobreski et al. | 428/422 |
| 4,839,216 | 6/1989 | Curro et al. | 428/134 |
| 4,894,275 | 1/1990 | Pelzer | 428/166 |
| 4,946,527 | 8/1990 | Battrell | 156/60 |
| 4,959,265 | 9/1990 | Wood et al. | 428/343 |
| 5,008,139 | 4/1991 | Ochi et al. | 428/40 |
| 5,080,957 | 1/1992 | Leseman et al. | 428/167 |
| 5,098,522 | 3/1992 | Smurkoski et al. | 162/358 |
| 5,112,674 | 5/1992 | German et al. | 428/216 |
| 5,116,677 | 5/1992 | Jones | 428/349 |
| 5,141,790 | 8/1992 | Calhoun et al. | 428/40 |
| 5,165,982 | 11/1992 | Gübitz et al. | 428/156 |
| 5,175,049 | 12/1992 | Huff et al. | 428/218 |
| 5,176,939 | 1/1993 | Shepherd | 427/146 |
| 5,208,096 | 5/1993 | Dohrer | 428/218 |
| 5,215,804 | 6/1993 | Hagens et al. | 428/156 |
| 5,221,276 | 6/1993 | Battrell | 604/389 |
| 5,245,025 | 9/1993 | Trokhan et al. | 536/56 |
| 5,246,762 | 9/1993 | Nakamura | 428/172 |
| 5,269,776 | 12/1993 | Lancaster et al. | 604/387 |
| 5,273,809 | 12/1993 | Simmons | 428/212 |
| 5,275,588 | 1/1994 | Matsumoto et al. | 604/372 |
| 5,296,277 | 3/1994 | Wilson et al. | 428/40 |
| 5,300,347 | 4/1994 | Underhill et al. | 428/171 |
| 5,310,587 | 5/1994 | Akohori et al. | 428/35.2 |
| 5,324,279 | 6/1994 | Lancaster et al. | 604/391 |
| 5,334,428 | 8/1994 | Dobreski et al. | 428/34.9 |
| 5,342,344 | 8/1994 | Lancaster et al. | 604/387 |
| 5,344,693 | 9/1994 | Sanders | 428/167 |
| 5,436,057 | 7/1995 | Schulz | 428/156 |
| 5,453,296 | 9/1995 | Lauritzen et al. | 427/208.6 |
| 5,458,938 | 10/1995 | Nygard et al. | 428/40 |
| 5,487,929 | 1/1996 | Rusincovitch, Jr. et al. | 428/40 |
| 5,514,122 | 5/1996 | Morris et al. | 604/387 |
| 5,518,801 | 5/1996 | Chappell et al. | 428/152 |
| 5,527,112 | 6/1996 | Dais et al. | 383/211 |
| 5,575,747 | 11/1996 | Dais et al. | 493/213 |
| 5,585,178 | 12/1996 | Calhoun et al. | 428/343 |
| 5,589,246 | 12/1996 | Calhoun | 428/167 |
| 5,597,639 | 1/1997 | Schulz | 428/156 |

FOREIGN PATENT DOCUMENTS

| | | | |
|---|---|---|---|
| 0 623 332 A1 | 9/1994 | European Pat. Off. | A61F 13/15 |
| 0 621 082 A1 | 10/1994 | European Pat. Off. | B05C 1/08 |
| 1 315 903 | 4/1963 | France . | |
| 1429312 | 2/1966 | France . | |
| 3-002292 | 1/1991 | Japan | A61F 13/56 |
| 7-246216 | 9/1995 | Japan | A61F 13/56 |
| 975783 | 11/1964 | United Kingdom . | |
| 1069445 | 5/1967 | United Kingdom . | |
| WO 92/00187 | 1/1992 | WIPO | B32B 3/00 |
| WO 95/11945 | 5/1995 | WIPO | C09J 7/02 |
| WO 95/31225 | 11/1995 | WIPO | A61L 15/58 |
| WO 96/31652 | 10/1996 | WIPO | D21H 27/02 |
| WO 96/41604 | 12/1996 | WIPO | A61F 13/58 |
| WO 97/18276 | 5/1997 | WIPO | C09J 7/02 |

OTHER PUBLICATIONS

Lim, J.H.F., et al., "Statistical Models to Describe the Structure of Porous Ceramic Membranes", *Separation Science and Technology,* 28 (1–3), pp. 821–854 (1993).

Watson, D.F., "Computing the n–dimensional Delaunay Tessellation with Application To Voronoi Polytopes", *The Computer Journal,* vol. 24, No.2, pp. 167–172 (1981).

Gardner, M., Penrose Tiles To Trapdoor Ciphers and The Return of Dr. Matrix, "Penrose Tiling", Chpt. 1, pp. 1–18.

10

THREE-DIMENSIONAL, AMORPHOUS-PATTERNED, NESTING-RESISTANT SHEET MATERIALS AND METHOD AND APPARATUS FOR MAKING SAME

FIELD OF THE INVENTION

The present invention relates to three-dimensional sheet materials which resist nesting of superimposed layers into one another. More particularly, the present invention relates to three-dimensional sheet materials having a plurality of three-dimensional protrusions extending outwardly from at least one side of the material which form an amorphous pattern. The present invention further relates to a method and apparatus for forming such three-dimensional sheet materials.

BACKGROUND OF THE INVENTION

Sheet materials having three-dimensional surfaces are well known in the art and have been utilized in many different applications. Such materials may be made in planar sheet form and remain in that form throughout handling or they may be made in continuous web form and be wound on rolls for handling. When in planar form, nesting of sheets may be useful to reduce stack height, for example. However, when wound onto rolls, nesting frequently causes significant problems. For example, nesting of layers having three dimensional surfaces on a roll may create difficulty unwinding the roll due to frictional engagement. Also, if nesting occurs more deeply at one end of the roll than the other end, roll telescoping may occur.

Nesting of any three-dimensional material can occur if protrusions in overlying webs or portions of the same web interlock with one another due to their size, shape, location, and/or geometrical arrangement. Two types of nesting or interlocking can occur: face-to-face nesting and face-to-back nesting. Face-to-face nesting can occur when two analogous faces of the same web or faces of plural webs are brought into contact and protrusions of each web or web portion enter valleys or spaces between adjacent protrusions of the other web or web portion. Face-to-back nesting can occur when opposing sides of the same web or dissimilar sides of plural webs are brought into contact and protrusions of one web or web portion enter the hollow "negative" side of protrusions of the other web or web portion. Such face-to-back nesting is of particular concern with three-dimensional sheet materials having hollow three-dimensional protrusions such as those of the present invention. If a web only exhibits three-dimensional surface features on one surface, i.e., the back surface is generally planar, then face-to-face nesting emerges as the primary consideration as face-to-back nesting cannot occur. While face-to-face nesting is more easily cured by selection of a protrusion spacing which is less than the width of the smallest protrusions, such a selection seriously limits the versatility of the resulting structure since such small protrusion spacing may be undesirable for some applications.

Nesting of adjacent layers or windings of a continuous web when rolled can create difficulty in unrolling the end of the web due to the frictional engagement which occurs with face-to-back nesting. Nesting of stacked individual layers or plies of three-dimensional web materials can result in removal of multiple sheets from a container when only a single sheet is desired, etc. While the ability of the web to nest with itself or with other webs may create a certain degree of difficulty in and of itself, where the three-dimensional web structure is utilized as a carrier for an active substance such as, for example, an adhesive, nesting can cause additional difficulties including premature adhesion and/or contamination of the active substance.

In the art of tapes, labels, and other articles using pressure sensitive adhesive to adhere an adhesive coated surface to a target surface, there has been recognized the problem of premature adhesion. That is, before the adhesive coated surface can be properly positioned over a target surface, inadvertent contact of the adhesive with the target surface causes premature adhesion at one or more locations, thereby inhibiting proper positioning. Others have attempted to overcome this problem by providing an initial contact surface spaced outwardly from the adhesive surface. The initial contact surface acts as a stand-off from the adhesive surface. This is achieved, for example, by a process that forms conical protrusions in a film and partially filling the valleys between protrusions with adhesive at a level below the tips of the protrusions. One such three-dimensional sheet material, as well as methods and apparatus for manufacturing same, is described in greater detail in commonly-assigned, co-pending U.S. patent application Ser. No. 08/584,638, now U.S. Pat. No. 5,662,758 entitled "Composite Material Releasably Sealable to a Target Surface When Pressed Thereagainst and Method of Making", filed Jan. 10, 1996 in the names of Peter W. Hamilton and Kenneth S. McGuire, the disclosure of which is hereby incorporated herein by reference.

While such three-dimensional sheet materials are useful for their intended use, there remains to be solved the issue of nesting of adjacent layers or windings of such materials during manufacture, storage, and dispensing prior to use.

Attempts have been made in the prior art to address the tendency of three-dimensional structures to nest with one another, particularly in the instance of superimposed sheet materials with hollow three-dimensional protrusions, by randomly or at least non-uniformly locating similarly-sized and shaped protrusions on the web. While this approach may be effective for certain web constructions, its effectiveness decreases as the total land area (free space without protrusions) decreases. This is due to the fact that, given an essentially constant protrusion size and shape, increasing the number density of protrusions decreases the degree of possible spacing and location variations to the point where, in a limiting case, the protrusions become so closely packed that they approach a closely-packed uniformly-spaced array. Moreover, due to the non-uniform placement of the protrusions the resulting physical properties of the web are also non-uniform and may be difficult to tailor if the placement is not predictable.

Accordingly, it would be desirable to provide a three-dimensional sheet material which resists nesting of one layer with another superimposed layer whether in planar sheet form or in rolled form.

It would further be desirable to provide a method for forming such three-dimensional sheet materials which may be suitably tailored for a particular material need and which may be readily and economically practiced.

It would also be desirable to provide a suitable forming apparatus for forming such three-dimensional sheet materials which may be tailored for a particular material need and which may be readily and economically utilized in commercial practice.

SUMMARY OF THE INVENTION

The present invention provides a three-dimensional, nesting-resistant sheet material having a first side and a second side. The first side comprises at least one region having a plurality of spaced three-dimensional protrusions extending outwardly from the first side which are preferably unitarily formed from the sheet material. To provide the nesting-resistant advantages of the present invention, the protrusions form an amorphous pattern of a plurality of different two-dimensional geometrical shapes. Preferably, the second side comprises a plurality of spaced, three-dimensional hollow depressions corresponding to the protrusions, such that the protrusions are hollow.

Of particular interest for certain applications, such as a carrier for a substance such as an adhesive, the protrusions are separated by an interconnected network of three-dimensional spaces between adjacent protrusions. The spaces preferably have substantially equivalent widths throughout the pattern and may be partially filled with an adhesive.

The three-dimensional, nesting-resistant sheet materials are preferably manufactured in accordance with the present invention utilizing a three-dimensional forming structure comprising an amorphous pattern of spaced three-dimensional recesses separated by interconnected lands. The recesses form an amorphous pattern of interlocking two-dimensional geometrical shapes.

The forming structure may be made according to the present invention by a method comprising the steps of: (a) generating a computer graphic having an amorphous two-dimensional pattern of interlocking two-dimensional geometrical shapes, the pattern having lines of substantially constant width between the interlocking shapes; and (b) transferring the amorphous two-dimensional pattern onto a forming structure to form a three-dimensional forming structure having three-dimensional recesses corresponding to the interlocking shapes and interconnected lands corresponding to the lines of substantially constant width. The amorphous pattern of interlocking shapes is preferably derived from a constrained Voronoi tessellation of 2-space in accordance with the present invention, wherein the tessellation is controlled by a constraint factor which controls the range of permissible center-to-center spacing of the interlocking shapes.

To manufacture the three-dimensional, nesting-resistant sheet materials in accordance with the present invention, a sheet of deformable material is introduced onto the forming structure and permanently deformed into compliance with the forming structure to generate a plurality of spaced, three-dimensional protrusions extending outwardly from a first side of the sheet of material which form an amorphous pattern of two-dimensional geometrical shapes. If desired, the interconnected lands of the forming structure may be coated with a substance before the sheet of deformable material is introduced onto the forming structure, the sheet of material having a greater affinity for the substance than the forming structure such that the substance will be removed from the forming structure along with the sheet material.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
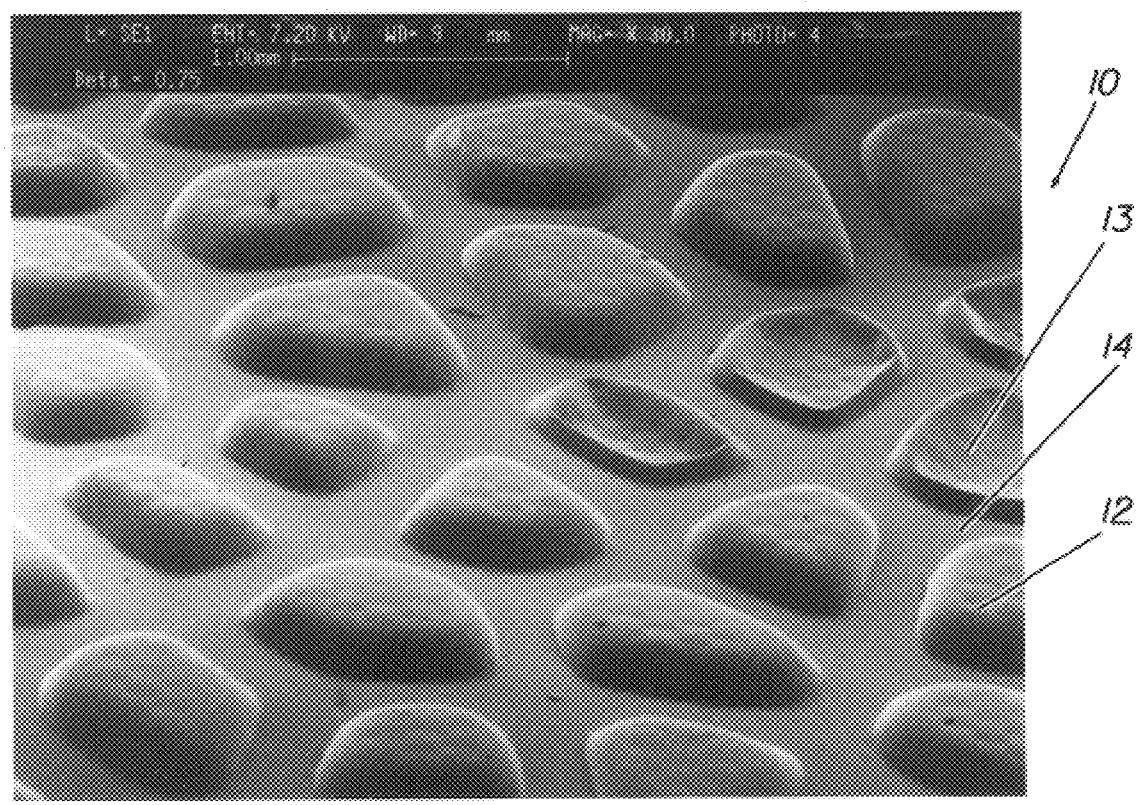
FIG. 1 is a photomicrograph depicting a perspective view of a representative three-dimensional, nesting-resistant sheet material in accordance with the present invention.

FIG. 1 is a photomicrograph of a three-dimensional sheet material 10 in accordance with a presently preferred embodiment of the present invention. The materials of the present invention exhibit a three-dimensional structure comprising a plurality of individual three-dimensional, hollow protrusions extending upward from a contiguous base structure. In order to accomplish the non-nesting advantages of the present invention when multiple individual webs or sheets of such material are superimposed upon one another in face-to-face or face-to-back orientation, the individual three-dimensional hollow protrusions are formed into non-uniform, frustum shapes in at least one web direction in the plane of the web. More preferably, the individual three-dimensional hollow protrusions are formed into non-uniform, polygonal frustum shapes in two mutually orthogonal web directions in the plane of the web.

When the material is formed into an elongated web with the intention of winding it upon a mandrel or upon itself (core-less roll) for purposes of compact storage, in accordance with the present invention the web exhibits the non-uniform pattern at least in the direction of rolling, and most preferably in both the rolling direction and the cross-rolling direction. While an infinitely non-repeating pattern may be desirable for certain applications, at a minimum the materials of the present invention will exhibit a non-uniform pattern property for a web distance at least as great as the maximum intended roll circumference of a roll of product.

In order to provide the greatest degree of nesting-resistance, the three-dimensional, nesting-resistant sheet materials of the present invention preferably exhibit a two-dimensional pattern of three-dimensional protrusions which is substantially amorphous in nature. As utilized herein, the term "amorphous" refers to a pattern which exhibits no readily perceptible organization, regularity, or orientation of constituent elements. This definition of the term "amorphous" is generally in accordance with the ordinary meaning of the term as evidenced by the corresponding definition in *Webster's Ninth New Collegiate Dictionary*. In such a pattern, the orientation and arrangement of one element with regard to a neighboring element bear no predictable relationship to that of the next succeeding element(s) beyond.

By way of contrast, the term "array" is utilized herein to refer to patterns of constituent elements which exhibit a regular, ordered grouping or arrangement. This definition of the term "array" is likewise generally in accordance with the ordinary meaning of the term as evidenced by the corresponding definition in *Webster's Ninth New Collegiate Dictionary*. In such an array pattern, the orientation and arrangement of one element with regard to a neighboring element bear a predictable relationship to that of the next succeeding element(s) beyond.

The degree to which order is present in an array pattern of three-dimensional protrusions bears a direct relationship to the degree of nestability exhibited by the web. For example, in a highly-ordered array pattern of uniformly-sized and shaped hollow protrusions in a close-packed hexagonal array, each protrusion is literally a repeat of any other protrusion. Nesting of regions of such a web, if not in fact the entire web, can be achieved with a web alignment shift between superimposed webs or web portions of no more than one protrusion-spacing in any given direction. Lesser degrees of order may demonstrate less nesting tendency, although any degree of order is believed to provide some degree of nestability. Accordingly, an amorphous, non-ordered pattern of protrusions would therefore exhibit the greatest possible degree of nesting-resistance.

While it is presently preferred that the entire surface of a web in accordance with the present invention exhibit such an amorphous pattern, under some circumstances it may be desirable for less than the entire surface of such a web to exhibit such a pattern. For example, a comparatively small portion of the web may exhibit some regular pattern of protrusions or may in fact be free of protrusions so as to present a generally planar surface. In addition, wherein the sheet material is to be formed as a comparatively large sheet of material and/or as an elongated continuous web to be folded or wound upon itself, manufacturing constraints may require that the amorphous pattern itself be repeated periodically within the web. Although any pattern repetition within the web allows some possibility of nesting occurring, such a possibility only exists when precise alignment of superimposed webs or web portions occurs with such webs or web portions representing exactly one repeat of the pattern (or an integer number of repeats for a continuous wound or folded web). This contrasts with the nesting character of webs formed of uniformly-shaped protrusions in an array pattern wherein each protrusion is a repeat of the adjacent protrusions such that the repeat distance is a single protrusion spacing. In such a configuration, alignment for nesting would occur if web alignment occurs with a shift of no more than one protrusion-spacing.

In a web with an amorphous pattern of three-dimensional protrusions, any selection of an adjacent plurality of protrusions will be unique within the scope of the pattern, even though under some circumstances it is conceivable that a given individual protrusion may possibly not be unique within the scope of the pattern. By utilizing an amorphous pattern, the three-dimensional sheet of material (in the case of a sheet having hollow, three-dimensional protrusions) will not nest unless precise superposition of sheets of material having the same amorphous pattern occurs.

Three-dimensional sheet materials having a two-dimensional pattern of three-dimensional protrusions which is substantially amorphous in nature are also believed to exhibit "isomorphism". As utilized herein, the terms "isomorphism" and its root "isomorphic" are utilized to refer to substantial uniformity in geometrical and structural properties for a given circumscribed area wherever such an area is delineated within the pattern. This definition of the term "isomorphic" is generally in accordance with the ordinary meaning of the term as evidenced by the corresponding definition in *Webster's Ninth New Collegiate Dictionary*. By way of example, a prescribed area comprising a statistically-significant number of protrusions with regard to the entire amorphous pattern would yield statistically substantially equivalent values for such web properties as protrusion area, number density of protrusions, total protrusion wall length, etc. Such a correlation is believed desirable with respect to physical, structural web properties when uniformity is desired across the web surface, and particularly so with regard to web properties measured normal to the plane of the web such as crush-resistance of protrusions, etc.

Utilization of an amorphous pattern of three-dimensional protrusions has other advantages as well. For example, it has been observed that three-dimensional sheet materials formed from a material which is initially isotropic within the plane of the material remain generally isotropic with respect to physical web properties in directions within the plane of the material. As utilized herein, the term "isotropic" is utilized to refer to web properties which are exhibited to substantially equal degrees in all directions within the plane of the material. This definition of the term "isotropic" is likewise generally in accordance with the ordinary meaning of the term as evidenced by the corresponding definition in *Webster's Ninth New Collegiate Dictionary*. Without wishing to be bound by theory, this is presently believed to be due to the non-ordered, non-oriented arrangement of the three-dimensional protrusions within the amorphous pattern. Conversely, directional web materials exhibiting web properties which vary by web direction will typically exhibit such properties in similar fashion following the introduction of the amorphous pattern upon the material. By way of example, such a sheet of material could exhibit substantially uniform tensile properties in any direction within the plane of the material if the starting material was isotropic in tensile properties.

Such an amorphous pattern in the physical sense translates into a statistically equivalent number of protrusions per unit length measure encountered by a line drawn in any given direction outwardly as a ray from any given point within the pattern. Other statistically equivalent parameters could include number of protrusion walls, average protrusion area, average total space between protrusions, etc. Statistical equivalence in terms of structural geometrical features with regard to directions in the plane of the web is believed to translate into statistical equivalence in terms of directional web properties.

Revisiting the array concept to highlight the distinction between arrays and amorphous patterns, since an array is by definition "ordered" in the physical sense it would exhibit some regularity in the size, shape, spacing, and/or orientation of protrusions. Accordingly, a line or ray drawn from a given point in the pattern would yield statistically different values depending upon the direction in which the ray extends for such parameters as number of protrusion walls, average protrusion area, average total space between protrusions, etc. with a corresponding variation in directional web properties.

Within the preferred amorphous pattern, protrusions will preferably be non-uniform with regard to their size, shape, orientation with respect to the web, and spacing between adjacent protrusion centers. Without wishing to be bound by theory, differences in center-to-center spacing of adjacent protrusions are believed to play an important role in reducing the likelihood of nesting occurring in the face-to-back nesting scenario. Differences in center-to-center spacing of protrusions in the pattern result in the physical sense in the spaces between protrusions being located in different spatial locations with respect to the overall web. Accordingly, the likelihood of a "match" occurring between superimposed portions of one or more webs in terms of protrusions/space locations is quite low. Further, the likelihood of a "match" occurring between a plurality of adjacent protrusions/spaces on superimposed webs or web portions is even lower due to the amorphous nature of the protrusion pattern.

In a completely amorphous pattern, as would be presently preferred, the center-to-center spacing is random, at least within a designer-specified bounded range, such that there is an equal likelihood of the nearest neighbor to a given protrusion occurring at any given angular position within the plane of the web. Other physical geometrical characteristics of the web are also preferably random, or at least non-uniform, within the boundary conditions of the pattern, such as the number of sides of the protrusions, angles included within each protrusion, size of the protrusions, etc. However, while it is possible and in some circumstances desirable to have the spacing between adjacent protrusions be non-uniform and/or random, the selection of polygon shapes which are capable of interlocking together makes a uniform spacing between adjacent protrusions possible. This is particularly useful for some applications of the three-dimensional, nesting-resistant sheet materials of the present invention, as will be discussed hereafter.

A sheet or web of material can be intentionally created with a plurality of amorphous areas within the same sheet or web, even to the point of replication of the same amorphous pattern in two or more such regions. The designer may purposely separate amorphous regions with a regular defined, non-amorphous pattern or array, or even a "blank" region with no protrusions at all, or any combination thereof. The formations contained within a non-amorphous area can be of any number density, height or shape. Further, the shape and dimensions of the non-amorphous region itself can be customized as desired. Additional examples of formation shapes, but not intended to be exhaustive, are: wedges emanating from a point; truncated wedges; polygons; circles; curvilinear shapes; or combinations thereof.

Additionally, a single amorphous region may fully envelop or circumscribe one or more non-amorphous areas. An example is a single, continuous amorphous region with non-amorphous patterns fully enclosed near the center of the sheet or web. Such imbedded patterns may communicate brand name, the manufacturer, instructions, material side or face indication, other information or simply be decorative in nature.

Multiple non-amorphous regions may be abutted or overlapped in a substantially contiguous manner to substantially divide one amorphous pattern into multiple regions or to separate multiple amorphous regions that were never part of a greater single amorphous region beforehand.

From the foregoing discussion it would be apparent that the utilization of an amorphous pattern of three-dimensional protrusions enables the fabrication of webs having the advantages of an array pattern, for example, statistical uniformity in web properties on an area/location basis, without the key disadvantages of using an array in such applications, namely nestability and anisotropism.

Figure 2:
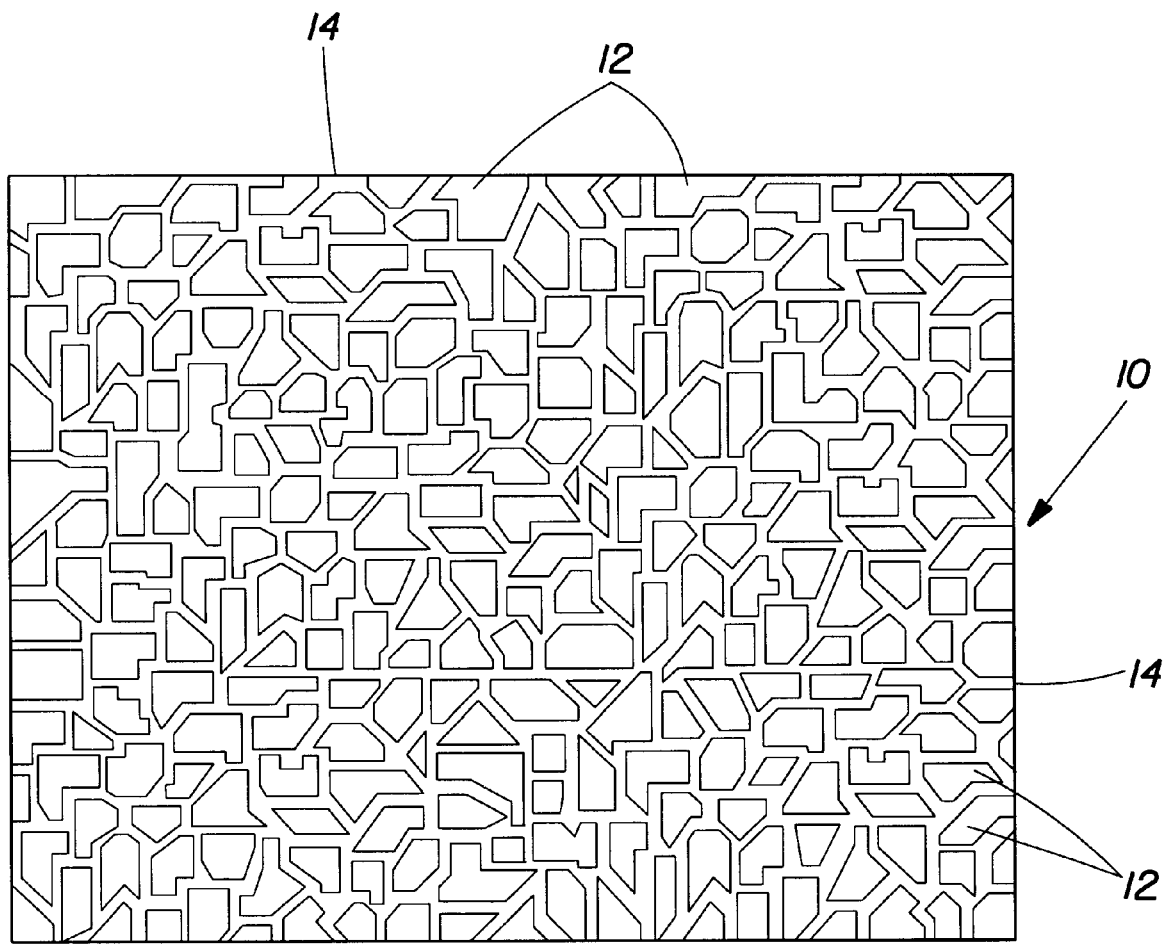
FIG. 2 is a plan view of another representative three-dimensional, nesting-resistant sheet material in accordance with the present invention.

Webs according to the present invention may have protrusions formed of virtually any three-dimensional shape, as depicted in FIG. 2, and accordingly need not be all of a convex polygonal shape. FIG. 2 is a plan view of a representative web 10 which includes protrusions 12 of various geometrical shapes extending upwardly from the plane of the material which are separated by valleys 14, the protrusions having a non-uniform size, shape, and spacing throughout the field of view and forming an amorphous pattern. However, it is presently preferred to form the protrusions in the shape of substantially-equal-height frustums having convex polygonal bases in the plane of one surface of the material and having interlocking, adjacent parallel sidewalls. Such a representative configuration is depicted in FIG. 1 which depicts the protrusions 12 and valleys 14. For other applications, however, the protrusions need not necessarily be of polygonal shape.

As used herein, the term "polygon" (and the adjective form "polygonal") is utilized to refer to a two-dimensional geometrical figure with three or more sides, since a polygon with one or two sides would define a line. Accordingly, triangles, quadrilaterals, pentagons, hexagons, etc. are included within the term "polygon", as would curvilinear shapes such as circles, ellipses, etc. which would have an infinite number of sides.

When designing a three-dimensional structure, the desired physical properties of the resulting structure will dictate the size, geometrical shape, and spacing of the three-dimensional topographical features as well as the choice of materials and forming techniques. For example, deformable three-dimensional protrusions will typically exhibit varying degrees of deformabilty, particularly crushability, depending upon their cross-sectional shape and average equivalent diameter. The bending modulus and/or flexibility of the overall web will depend upon the relative proportion of two-dimensional material between three-dimensional protrusions.

When describing properties of three-dimensional structures of non-uniform, particularly non-circular, shapes and non-uniform spacing, it is often useful to utilize "average" quantities and/or "equivalent" quantities. For example, in terms of characterizing linear distance relationships between three-dimensional protrusions in a two-dimensional pattern, where spacings on a center-to-center basis or on an individual spacing basis, an "average" spacing term may be useful to characterize the resulting structure. Other quantities that could be described in terms of averages would include the proportion of surface area occupied by protrusions, protrusion area, protrusion circumference, protrusion diameter, etc. For other dimensions such as protrusion circumference and protrusion diameter, an approximation can be made for protrusions which are non-circular by constructing a hypothetical equivalent diameter as is often done in hydraulic contexts.

The three-dimensional shape of individual protrusions is believed to play a role in determining both the physical properties of individual protrusions as well as overall web properties. Of particular interest for certain applications is crush resistance of protrusions (i.e., their ability to resist a deformation by crushing and/or inverting in a direction substantially perpendicular to the plane of the material). Without wishing to be bound by theory, it is presently believed that the crush resistance of a given protrusion depends upon the crush strengths of the individual panel segments which define each facet along the perimeter of the protrusion. The panel segment with the lowest crush strength limits the crush strength of the protrusion, much as the weakest link defines the strength of a length of chain.

Buckling strengths of individual panels can be increased by introducing curvature to the panel in a plane perpendicular to the crush direction, with buckling strength increasing with decreasing radius of curvature. Buckling strengths of individual panels may also be increased by decreasing the width of the panel for a constant height (i.e., decreasing the aspect ratio). In the case of non-curvilinear protrusions having a finite number of sides of substantially planar shape, application of these principles suggests that protrusions will exhibit generally greater crush resistance as the equality in side length and included angles increases by minimizing the "weakest link" effect. Accordingly, a protrusion with one side substantially longer than the others will be limited in crush strength by the buckling behavior of that longest side. Therefore, crush strength for a given perimeter and given wall thickness would be greater for a protrusion having a greater number of smaller sides and would maximize its crush resistance by having the sides of substantially similar dimensions to minimize the weakest link effect.

It should be noted that the foregoing discussion assumes geometric replication of three-dimensional structures from a forming structure of geometrically-sound shapes. "Real world" effects such as curvature, degree of moldability, radius of corners, etc. should be taken into account with regard to ultimately exhibited physical properties.

The use of an interlocking network of frustums, as depicted in FIGS. 1 and 2, provides some sense of uniformity to the overall web structure, which aids in the control and design of overall web properties such as web stretch, tensile strength, roll profile and thickness, etc., while maintaining the desired degree of amorphousness in the pattern. In addition, when utilized as a base structure for application of an adhesive or other active substance as described in the above-referenced and incorporated commonly-assigned, co-pending U.S. patent application Ser. No. 08/584,638, the use of an interlocking polygonal base pattern for the protrusions provides a controllable width and spacing of the valleys between the protrusions so that the area available for contact of the active agent with a target surface may be tailored. The use of external polygonal bases from which the sides of the frustums extend upwardly also add a degree of predictability and uniformity to the collapse of the protrusions under compressive forces and also improves the release properties of the formed material from the corresponding forming structure.

The use of polygons having a finite number of sides in the amorphous pattern arranged in an interlocking relationship also provides an advantage over structures employing circular or nearly-circular shapes. Patterns such as arrays employing closely-packed circles are limited in terms of the amount of area the circles can occupy relative to the non-circled area between adjacent circles. More specifically, even in a pattern where adjacent circles touch at their point of tangency there will still be a given amount of space "trapped" at the "corners" between consecutive points of tangency. Accordingly, even amorphous patterns of circular shapes are limited in terms of how little non-circle area can be designed into the structure. Conversely, interlocking polygonal shapes with finite numbers of sides (i.e., no shapes with curvilinear sides) can be designed so as to pack closely together and in the limiting sense can be packed such that adjacent sides of adjacent polygons can be in contact along their entire length such that there is no "trapped" free space between corners. Such patterns therefore open up the entire possible range of polygon area from nearly 0% to nearly 100%, which may be particularly desirable for certain applications where the low end of free space becomes important for functionality.

Any suitable method may be utilized to design the interlocking polygonal arrangement of hollow frustums which provides suitable design capability in terms of desirable protrusion size, shape, taper, spacing, repeat distance, etc. Even manual methods of design may be utilized. Such pattern may be imparted to the starting web material in any suitable fashion, including manual methods and methods of individually custom-forming the protrusions.

However, in accordance with the present invention, an expeditious method of designing and forming such protrusions has been developed which permits the precise tailoring of desirable protrusion size, shape, taper, and spacing within an amorphous pattern, repeat distance of the amorphous pattern, etc. as well as the continuous formation of webs containing such protrusions in an automated process.

A totally random pattern of three-dimensional hollow protrusions in a web such as those depicted in FIG. 2 would, in theory, never exhibit face-to-back nesting since the shape and alignment of each frustum would be unique. However, the design of such a totally random pattern would be very time-consuming and complex proposition, as would be the method of manufacturing a suitable forming structure. In accordance with the present invention, the non-nesting attributes may be obtained by designing patterns or structures where the relationship of adjacent cells or structures to one another is specified, as is the overall geometrical character of the cells or structures, but wherein the precise size, shape, and orientation of the cells or structures is non-uniform and non-repeating. The term "non-repeating", as utilized herein, is intended to refer to patterns or structures where an identical structure or shape is not present at any two locations within a defined area of interest. While there may be more than one protrusion of a given size and shape within the pattern or area of interest, the presence of other protrusions around them of non-uniform size and shape virtually eliminates the possibility of an identical grouping of protrusions being present at multiple locations. Said differently, the pattern of protrusions is non-uniform throughout the area of interest such that no grouping of protrusions within the overall pattern will be the same as any other like grouping of protrusions. The beam strength of the three-dimensional sheet material will prevent significant nesting of any region of material surrounding a given protrusion even in the event that that protrusion finds itself superimposed over a single matching depression since the protrusions surrounding the single protrusion of interest will differ in size, shape, and resultant center-to-center spacing from those surrounding the other protrusion/depression.

Professor Davies of the University of Manchester has been studying porous cellular ceramic membranes and, more particularly, has been generating analytical models of such membranes to permit mathematical modeling to simulate real-world performance. This work was described in greater detail in a publication entitled "Porous cellular ceramic membranes: a stochastic model to describe the structure of an anodic oxide membrane", authored by J. Broughton and G. A. Davies, which appeared in the *Journal of Membrane Science*, Vol. 106 (1995), at pp. 89–101, the disclosure of which is hereby incorporated herein by reference. Other related mathematical modeling techniques are described in greater detail in "Computing the n-dimensional Delaunay tessellation with application to Voronoi polytopes", authored by D. F. Watson, which appeared in *The Computer Journal*, Vol. 24, No. 2 (1981), at pp. 167–172, and "Statistical Models to Describe the Structure of Porous Ceramic Membranes", authored by J. F. F. Lim, X. Jia, R. Jafferali, and G. A. Davies, which appeared in *Separation Science and Technology*, 28(1–3) (1993) at pp. 821–854, the disclosures of both of which are hereby incorporated herein by reference.

As part of this work, Professor Davies developed a two-dimensional polygonal pattern based upon a constrained Voronoi tessellation of 2-space. In such a method, again with reference to the above-identified publication, nucleation points are placed in random positions in a bounded (pre-determined) plane which are equal in number to the number of polygons desired in the finished pattern. A computer program "grows" each point as a circle simultaneously and radially from each nucleation point at equal rates. As growth fronts from neighboring nucleation points meet, growth stops and a boundary line is formed. These boundary lines each form the edge of a polygon, with vertices formed by intersections of boundary lines.

While this theoretical background is useful in understanding how such patterns may be generated and the properties of such patterns, there remains the issue of performing the above numerical repetitions step-wise to propagate the nucleation points outwardly throughout the desired field of interest to completion. Accordingly, to expeditiously carry out this process a computer program is preferably written to perform these calculations given the appropriate boundary conditions and input parameters and deliver the desired output.

The first step in generating a pattern for making a three-dimensional forming structure is to establish the dimensions of the desired forming structure. For example, if it is desired to construct a forming structure 8 inches wide and 10 inches long, for optionally forming into a drum or belt as well as a plate, then an X-Y coordinate system is established with the maximum X dimension ($X_{Max}$) being 8 inches and the maximum Y dimension ($Y_{Max}$) being 10 inches (or vice-versa).

After the coordinate system and maximum dimensions are specified, the next step is to determine the number of "nucleation points" which will become polygons corresponding to the number of protrusions desired within the defined boundaries of the forming structure. This number is an integer between 0 and infinity, and should be selected with regard to the average size and spacing of the polygons desired in the finished pattern. Larger numbers correspond to smaller polygons, and vice-versa. A useful approach to determining the appropriate number of nucleation points or polygons is to compute the number of polygons of an artificial, hypothetical, uniform size and shape that would be required to fill the desired forming structure. Assuming common units of measurement, the forming structure area (length times width) divided by the square of the sum of the polygon diameter and the spacing between polygons will yield the desired numerical value N (rounded to the nearest integer). This formula in equation form would be:

$$N = \frac{X_{Max} Y_{Max}}{(\text{polygon size} + \text{polygon spacing})^2}$$

A random number generator is required for the next step. Any suitable random number generator known to those skilled in the art may be utilized, including those requiring a "seed number" or utilizing an objectively determined starting value such as chronological time. Many random number generators operate to provide a number between zero and one (0–1), and the discussion hereafter assumes the use of such a generator. A generator with differing output may also be utilized if the result is converted to some number between zero and one or if appropriate conversion factors are utilized.

A computer program is written to run the random number generator the desired number of iterations to generate as many random numbers as is required to equal twice the desired number of "nucleation points" calculated above. As the numbers are generated, alternate numbers are multiplied by either the maximum X dimension or the maximum Y dimension to generate random pairs of X and Y coordinates all having X values between zero and the maximum X dimension and Y values between zero and the maximum Y dimension. These values are then stored as pairs of (X,Y) coordinates equal in number to the number of "nucleation points".

If the method described in the preceding paragraph is utilized to generate a resulting pattern, the pattern will be truly random. This truly random pattern will, by its nature, have a large distribution of polygon sizes and shapes which may be undesirable in some instances. For example, a large distribution of polygon sizes may lead to large variations in web properties in various regions of the web and may lead to difficulties in forming the web depending upon the formation method selected. In order to provide some degree of control over the degree of randomness associated with the generation of "nucleation point" locations, a control factor or "constraint" is chosen and referred to hereafter as β (beta). The constraint limits the proximity of neighboring nucleation point locations through the introduction of an exclusion distance, E, which represents the minimum distance between any two adjacent nucleation points. The exclusion distance E is computed as follows:

$$E = \frac{2\beta}{\sqrt{\lambda \pi}}$$

where λ (lambda) is the number density of points (points per unit area) and β ranges from 0 to 1.

To implement the control of the "degree of randomness", the first nucleation point is placed as described above. β is then selected, and E is calculated from the above equation. Note that β, and thus E, will remain constant throughout the placement of nucleation points. For every subsequent nucleation point (X,Y) coordinate that is generated, the distance from this point is computed to every other nucleation point that has already been placed. If this distance is less than E for any point, the newly-generated (X,Y) coordinates are deleted and a new set is generated. This process is repeated until all N points have been successfully placed. If β=0, then the exclusion distance is zero, and the pattern will be truly random. If β=1, the exclusion distance is equal to the nearest neighbor distance for a hexagonally close-packed array. Selecting β between 0 and 1 allows control over the "degree of randomness" between these two extremes.

Once the complete set of nucleation points are computed and stored, a Delaunay triangulation is performed as the precursor step to generating the finished polygonal pattern. The use of a Delaunay triangulation in this process constitutes a simpler but mathematically equivalent alternative to iteratively "growing" the polygons from the nucleation points simultaneously as circles, as described in the theoretical model above. The theme behind performing the triangulation is to generate sets of three nucleation points forming triangles, such that a circle constructed to pass through those three points will not include any other nucleation points within the circle. To perform the Delaunay triangulation, a computer program is written to assemble every possible combination of three nucleation points, with each nucleation point being assigned a unique number (integer) merely for identification purposes. The radius and center point coordinates are then calculated for a circle passing through each set of three triangularly-arranged points. The coordinate locations of each nucleation point not used to define the particular triangle are then compared with the coordinates of the circle (radius and center point) to determine whether any of the other nucleation points fall within the circle of the three points of interest. If the constructed circle for those three points passes the test (no other nucleation points falling within the circle), then the three point numbers, their X and Y coordinates, the radius of the circle, and the X and Y coordinates of the circle center are stored. If the constructed circle for those three points fails the test, no results are saved and the calculation progresses to the next set of three points.

Once the Delaunay triangulation has been completed, a Voronoi tessellation of 2-space is then performed to generate the finished polygons. To accomplish the tessellation, each nucleation point saved as being a vertex of a Delaunay triangle forms the center of a polygon. The outline of the polygon is then constructed by sequentially connecting the center points of the circumscribed circles of each of the Delaunay triangles, which include that vertex, sequentially in clockwise fashion. Saving these circle center points in a repetitive order such as clockwise enables the coordinates of the vertices of each polygon to be stored sequentially throughout the field of nucleation points. In generating the polygons, a comparison is made such that any triangle vertices at the boundaries of the pattern are omitted from the calculation since they will not define a complete polygon.

Once a finished pattern of interlocking polygonal two-dimensional shapes is generated, in accordance with the present invention such a network of interlocking shapes is utilized as the design for one web surface of a web of material with the pattern defining the shapes of the bases of the three-dimensional, hollow protrusions formed from the initially planar web of starting material. In order to accomplish this formation of protrusions from an initially planar web of starting material, a suitable forming structure comprising a negative of the desired finished three-dimensional structure is created which the starting material is caused to conform to by exerting suitable forces sufficient to permanently deform the starting material.

From the completed data file of polygon vertex coordinates, a physical output such as a line drawing may be made of the finished pattern of polygons. This pattern may be utilized in conventional fashion as the input pattern for a metal screen etching process to form a three-dimensional forming structure suitable for forming the materials of the present invention. If a greater spacing between the polygons is desired, a computer program can be written to add one or more parallel lines to each polygon side to increase their width (and hence decrease the size of the polygons a corresponding amount).

Preferably, the computer program described above provides as its output a computer graphic (TIFF) file. From this data file, a photographic negative can be made for use in a photoetching process to etch negative impressions into a base material to correspond to the desired frustum polygonal shapes in the finished web of material. Alternatively, depending upon the desired process of generating the negative forming structure for forming the finished web, it may be desirable to tailor the output of the computer program to deliver coordinate points, etc. of the polygonal recesses, such as would prove useful if a mechanical process were to be utilized. In addition, if it were desirable to form a male pattern the computer output could be tailored to provide the desired information to the forming apparatus to the extent it may differ than for a negative (female) pattern.

Figure 3:
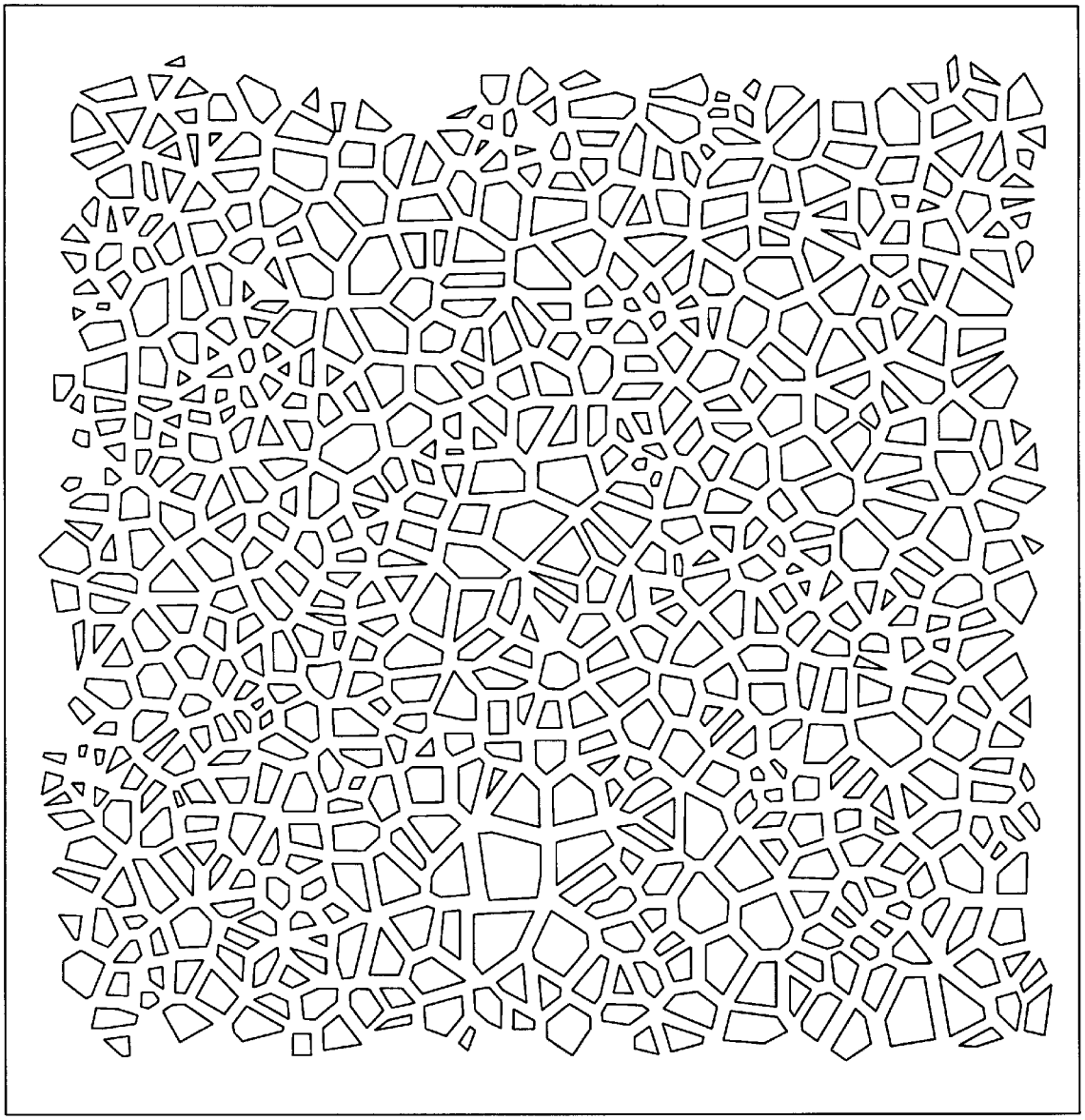
FIG. 3 is a plan view of one embodiment of a three-dimensional, nesting-resistant sheet material in accordance with the present invention.
Figure 4:
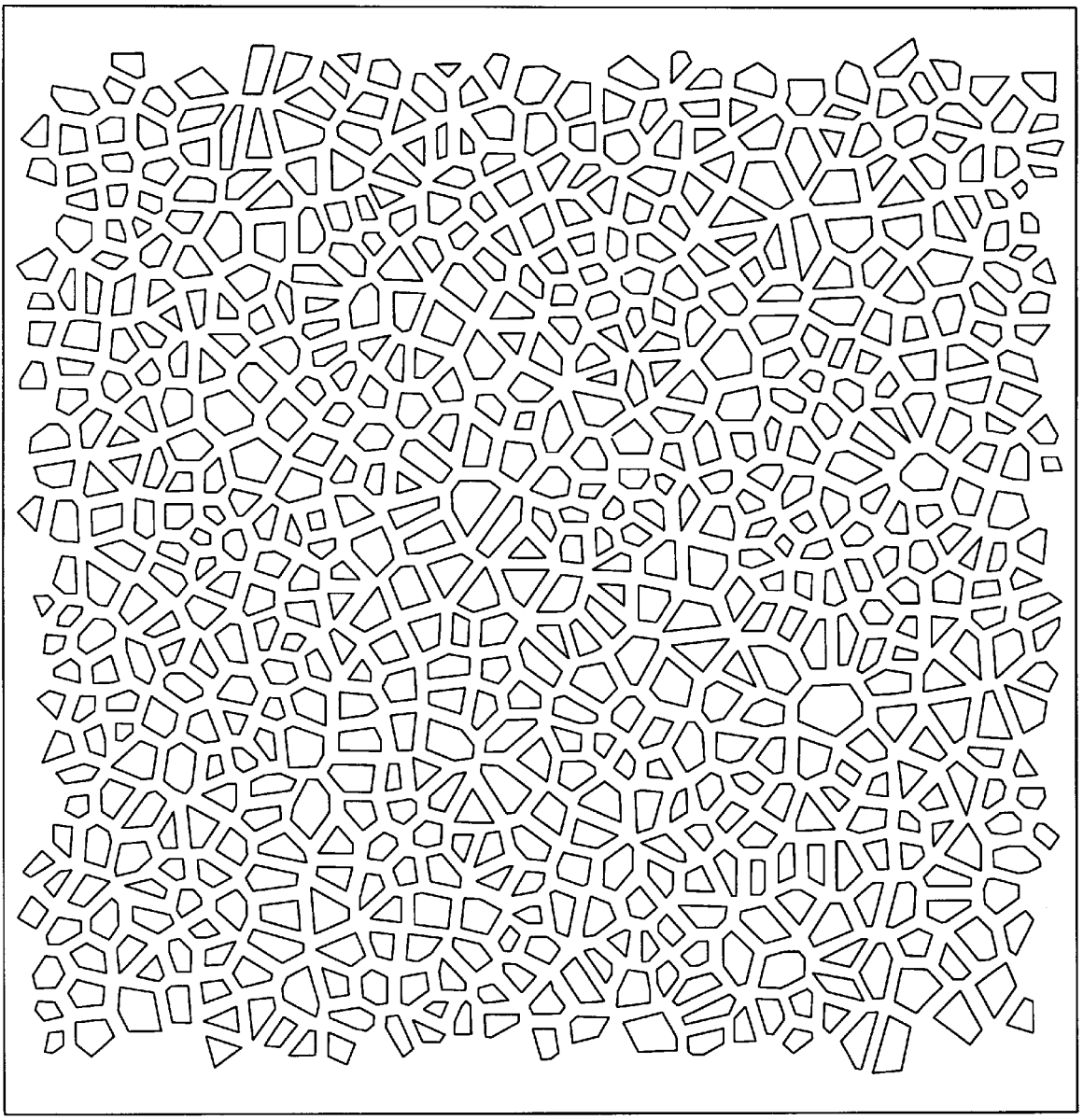
FIG. 4 is a plan view of another embodiment of a three-dimensional, nesting-resistant sheet material in accordance with the present invention.
Figure 5:
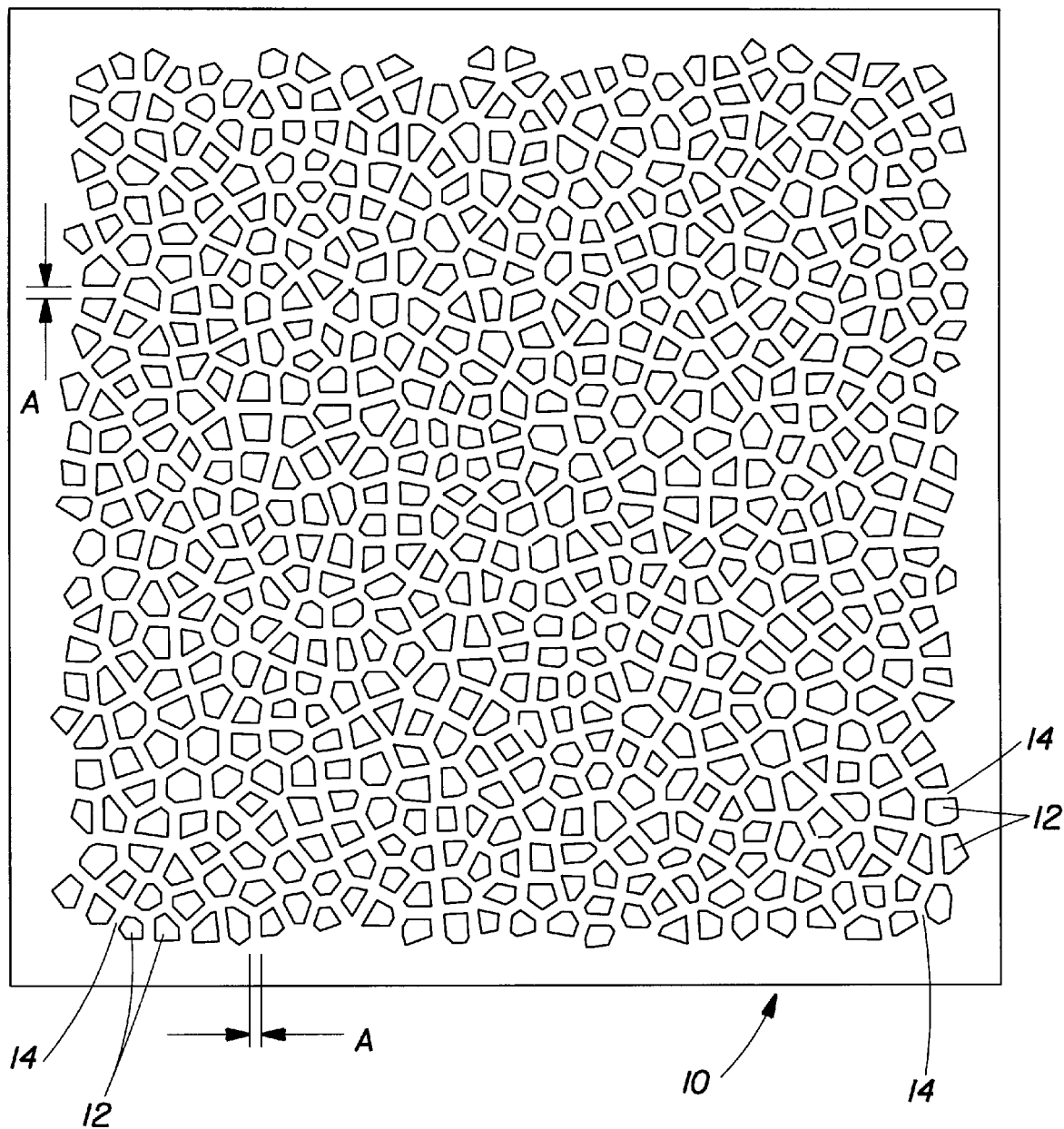
FIG. 5 is a plan view of a preferred embodiment of a three-dimensional, nesting-resistant sheet material in accordance with the present invention.

To provide further illustration of the effect of increasing levels of constraint obtained by various values of $\beta$, FIGS. 3–5 provide plan views of three-dimensional sheet materials 10 constructed utilizing $\beta$ values of 0.25, 0.5, and 0.75, respectively. As can be seen from FIGS. 3–5, a $\beta$ value of 0.25 (i.e., in the lower end of the range of 0 to 1) yields a much greater variation in the center-to-center spacing of the nucleation points and thus the resulting polygons than does a $\beta$ value of 0.75 (i.e., near the higher end of the range of 0 to 1). Such degree of variation in center-to-center spacing also in the geometrical sense translates into a corresponding degree of variation in number of sides in the resulting polygons as well as polygon size, the effects of which were discussed above. In order to produce the desired level of amorphousness in the resulting pattern of polygons, the value presently preferred for $\beta$ is 0.75, but this value may of course be tailored as required to suit a particular application. FIG. 1 is a photomicrograph depicting a three-dimensional sheet material formed utilizing a pattern generated with a $\beta$ value of 0.75.

Figure 6:
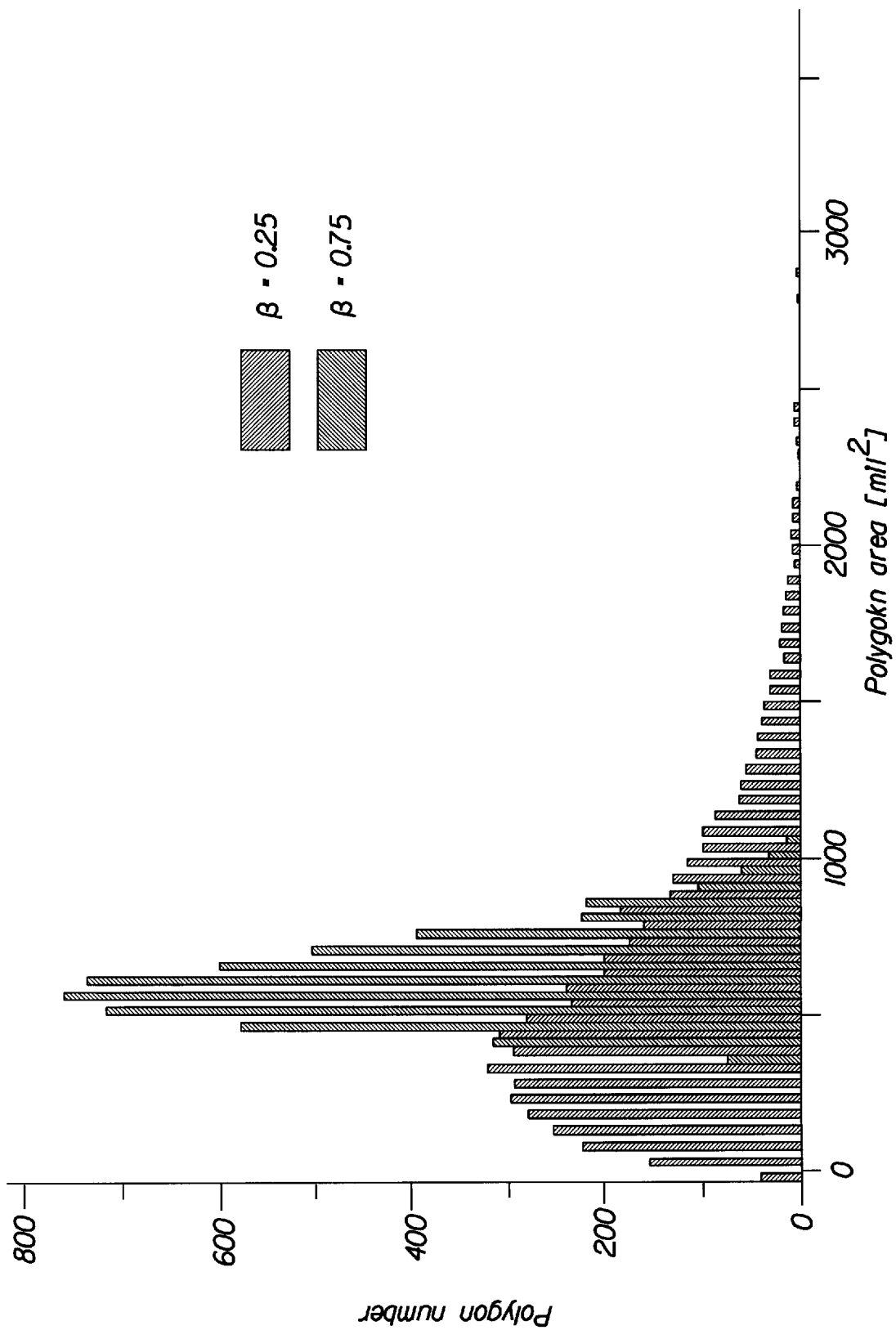
FIG. 6 is a graph depicting a comparison between the polygon area distributions of the sheet materials of FIGS. 3 and 5.

FIG. 6 is a graph depicting polygon area (in square mils) versus the number of polygons exhibiting a given area for the three-dimensional sheet materials of FIGS. 3 and 5 ($\beta$=0.25 and 0.75, respectively). As shown in FIG. 6, the polygon area distribution decreases as the constraint ($\beta$) is increased. Said differently, the less constrained pattern exhibits a broader range of polygon sizes than the more constrained pattern. Both materials were prepared utilizing the above method with a design criteria of 711 polygons per square inch with a spacing between adjacent polygons of 0.015 inches. The patterns depicted in FIGS. 3 and 5 are each a portion of the pattern utilized to generate the data presented in FIG. 6.

Figure 7:
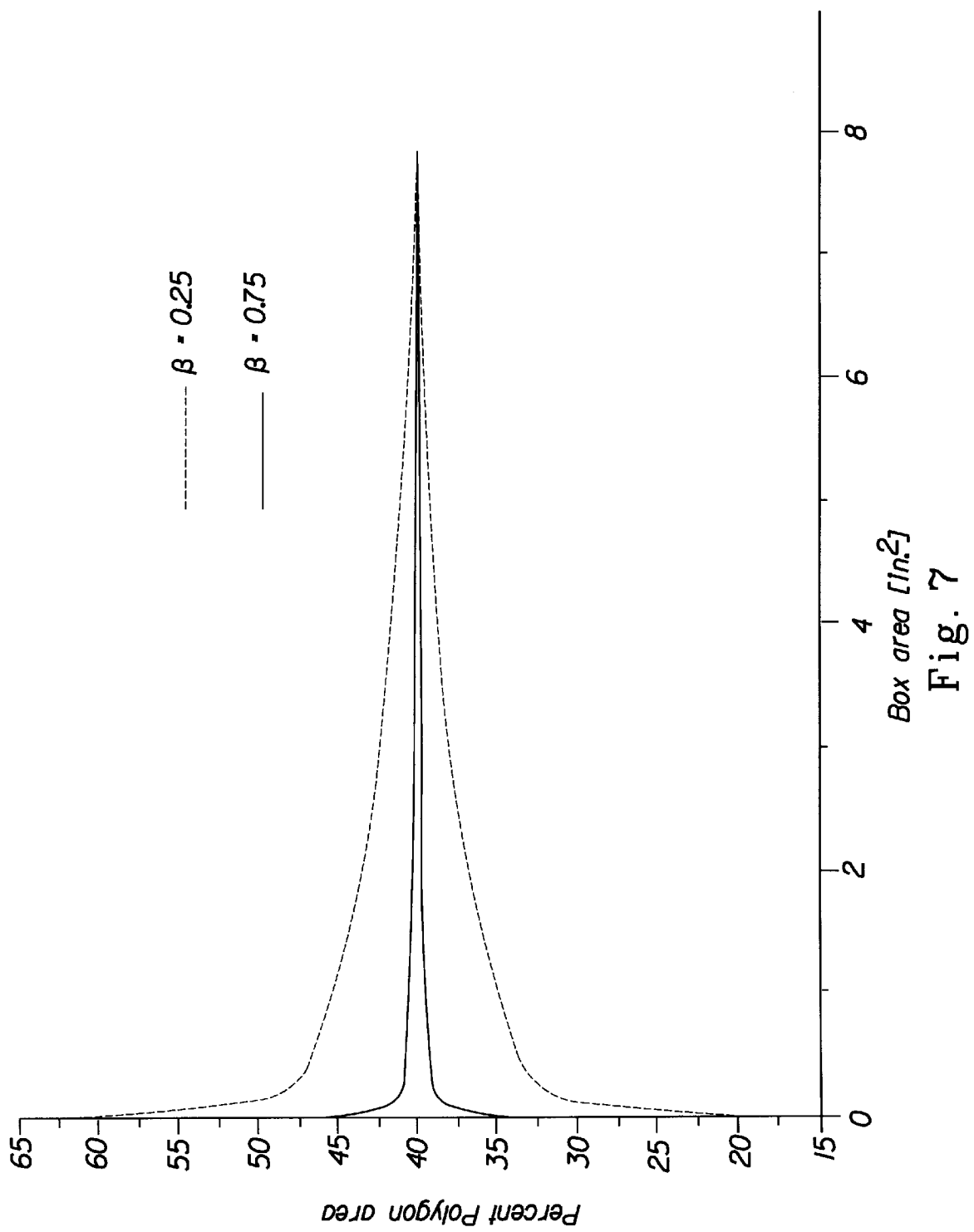
FIG. 7 is a graph depicting a comparison between the polygon area variations of the sheet materials of FIGS. 3 and 5.

FIG. 7 is a graph depicting a similar comparison to that of FIG. 6, but depicting the upper and lower limits of % polygon area for the three-dimensional sheet materials of FIGS. 3 and 5 ($\beta$=0.25 and 0.75, respectively) for given sample or "box" area sizes (in square inches) throughout the pattern. The same patterns were utilized for this Figure as were utilized for FIG. 6. As shown in FIG. 7, a change in the area of the test box affects the range of % polygon area for a given pattern. As the area of the test box decreases, the variability in % polygon area increases. Conversely, as the area of the test box increases, beyond a certain point the % polygon area remains constant throughout the pattern. The effect of the constraint upon this variability is depicted in FIG. 7, as the more constrained material of FIG. 5 displays a much narrower range of % polygon area and converges to a constant % polygon area when a box area of about 4 square inches is reached, while the less constrained material of FIG.

3 displays a wider range of % polygon area and does not converge to a constant % polygon area until a box area of at least about 8 square inches is reached. Further, for consistency in physical properties throughout the web more constrained tessellations exhibit less variation in aerial density, i.e., the localized number of protrusions and corresponding protrusions wells, per unit area.

Based upon the data presented in FIGS. 6 and 7, it would be apparent that a predictable level of consistency may be designed into the patterns generated according to the preferred method of the present invention even though amorphousness within the pattern is preserved. Accordingly, three-dimensional, amorphous-patterned, nesting-resistant materials may be formed with statistically-predictable geometric and physical material properties.

Referring once again to the drawings, and more particularly to FIG. 5, there is shown a plan view of a representative three-dimensional, nesting-resistant sheet material of the present invention, which is generally indicated as 10. FIG. 5 represents an amorphous two-dimensional pattern generated by the above-described method utilizing a constraint factor of 0.75. Material 10 has a plurality of non-uniformly shaped and sized, preferably hollow, protrusions 12, surrounded by spaces or valleys 14 therebetween, which are preferably interconnected to form a continuous network of spaces within the amorphous pattern. FIG. 5 also shows a dimension A, which represents the width of spaces 14, measured as the substantially perpendicular distance between adjacent, substantially parallel walls at the base of the protrusions. In a preferred embodiment, the width of spaces 14 is preferably substantially constant throughout the pattern of protrusions.

Protrusions 12 of the present invention are generated with non-uniform size and shape so that material 10 may be wound onto a roll without nesting occurring between layers of material within the roll. The nesting-resistant feature is achieved because the amorphous pattern of the protrusions, as discussed above, limits the ability of the face of one layer to align with the back of another layer whereby the protrusions of one layer enter the depressions formed behind each protrusion in an adjacent layer. The benefit of narrow constant-width spaces between protrusions is that protrusions 12 cannot also enter spaces 14 when layers of material 10 are placed face to face.

Protrusions 14 are preferably spaced center to center an average distance of approximately two protrusion base diameters or closer, in order to minimize the volume of valleys between protrusions and hence the amount of substance located between them. For applications where it is intended that the protrusions be deformable, the protrusions 14 preferably have heights which are less than their diameters, so that when they deform, they deform by substantially inverting and/or crushing along an axis which is substantially perpendicular to a plane of the material. This protrusion shape and mode of deforming discourages protrusions 14 from folding over in a direction parallel to a plane of the material so that the protrusions cannot block a substance (if present) in the valley between them from contact with a target surface.

Returning briefly to the photomicrograph of FIG. 1, representative protrusion 12 is shown in a representative as-formed condition, while representative protrusion 13 is shown in a deformed condition wherein the upper central portion of the protrusion has been pushed downwardly such that the protrusion has collapsed by substantially inverting upon itself Such deformation thereby reduces the height of the protrusion without extending outwardly over the adjoining valley or space between protrusions.

Figure 8:
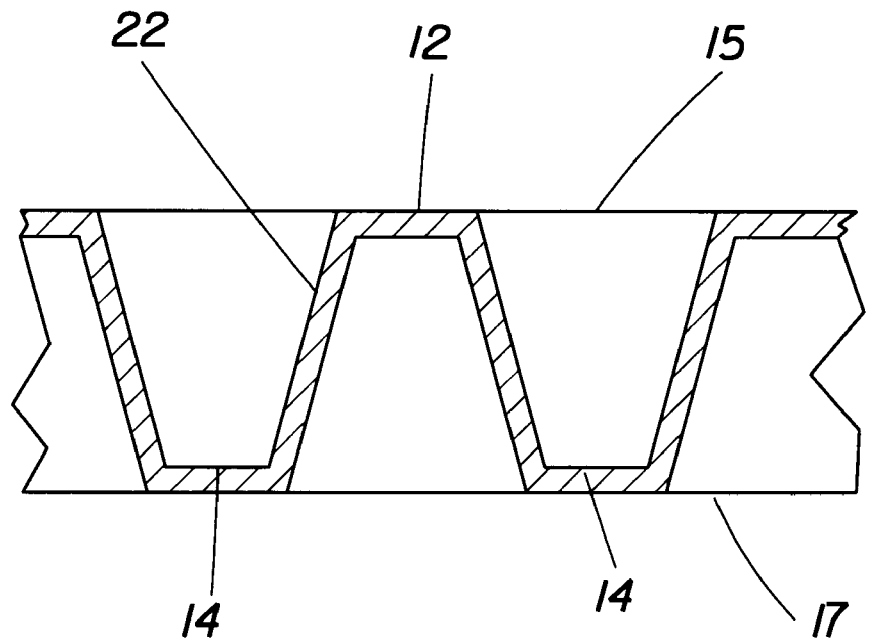
FIG. 8 is a partial elevational sectional view of the three-dimensional, nesting-resistant sheet material of FIG. 5.
Figure 9:
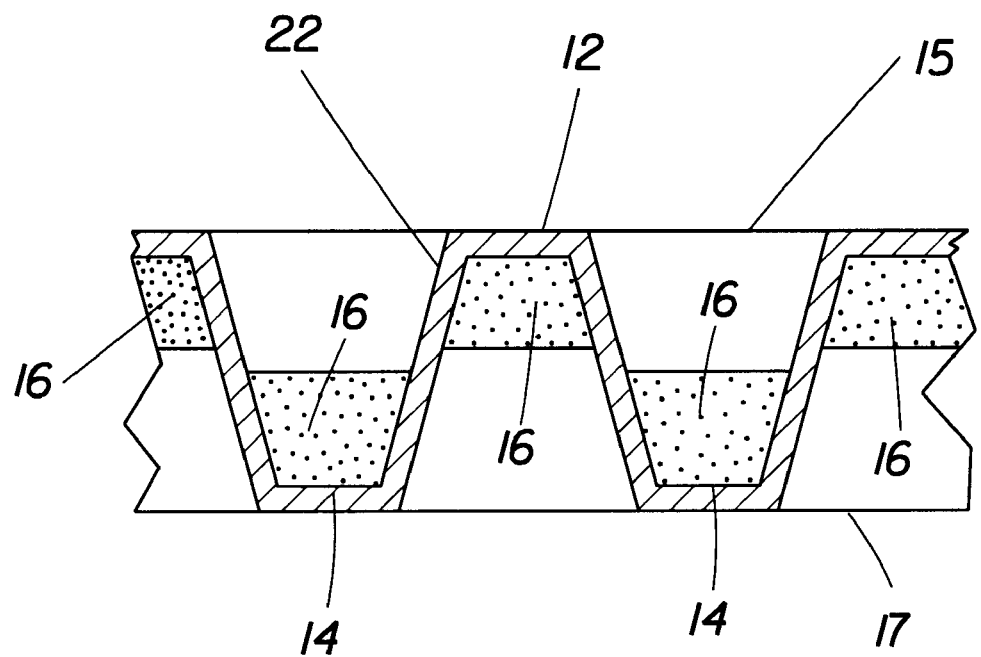
FIG. 9 is a partial elevational sectional view similar to that of FIG. 8, but depicting an embodiment of the present invention wherein a substance is included within the three-dimensional structure of the web.

FIGS. 8 and 9 depict fragmentary elevational cross-sections of material 10 taken at a location where a complete protrusion 12 and both adjoining spaces or valleys 14 can be seen in cross-section. FIG. 8 depicts the three-dimensional structure of FIG. 5 by itself, with no adhesive or other substance added to the basic sheet material. In this view, the upper surface of the web which faces the viewer of FIG. 5, and which includes the projecting portions of the protrusions 12, is identified with the numeral 15, and is referred to hereafter as the male side of the material. Correspondingly, the lower surface of the web facing away from the viewer of FIG. 5, which includes the openings of the hollow portions of the protrusions 12, is identified with the numeral 17, and is referred to hereafter as the female side of the material.

FIG. 9 shows the structure of FIG. 5, analogously to FIG. 8, but with a substance 16 added to spaces 14, as well as to the hollow underside of the protrusions 12, in accordance with the teachings of commonly-assigned, co-pending concurrently-filed U.S. patent application Ser. No. 08/744, 850 now U.S. Pat. No. 5,871,607, Attorney's Docket No. Case 5922R, filed Nov. 8, 1996, in the names of Peter W. Hamilton and Kenneth S. McGuire, entitled "Material Having A Substance Protected By Deformable Standoffs and Method of Making", the disclosure of which is hereby incorporated herein by reference. Substance 16 partially fills the spaces 14 so that an outer surface of protrusions 12 remain external to the surface level of substance 16 such that the protrusions prevent the substance 16 on the male side of the material from making contact with external surfaces. With regard to the male side of the material, substance 16 partially fills the hollow protrusions such that the reverse side of the valleys or spaces between respective protrusions serves an analogous function in preventing substance 16 within the protrusions from making contact with external surfaces. Substances within different sides of the material 10 and/or within different geometrically-distinct zones within a side of material 10 need not be the same substance and could in fact be distinctly different substances serving distinctly different functions.

"Substance" is defined in this invention as any material capable of being held in open valleys and/or depressions of a three dimensional structure. In the present invention, the term "substance" can mean a flowable substance which is substantially non-flowing prior to delivery to a target surface. "Substance" can also mean a material which doesn't flow at all, such as a fibrous or other interlocking material. "Substance" may mean a fluid or a solid. Adhesives, electrostatics, mechanical interlocking, capillary attraction, surface adsorption, and friction, for example, may be used to hold the substances in the valleys and/or depressions. The substances may be permanently held in the valleys and/or depressions, or the substances may be intended to be released therefrom when exposed to contact with external surfaces or when the three dimensional structure is deformed, heated, or otherwise activated. Of current interest in the present invention include substances such as gels, pastes, foams, powders, agglomerated particles, prills, microencapsulated liquids, waxes, suspensions, liquids, and combinations thereof.

The spaces in the three-dimensional structure of the present invention are normally open; therefore it is desirable to have substances stay in place and not run out of the structure without an activation step. The activation step of the present invention is preferably deformation of the three-dimensional structure by compression. However, an activation step to cause substance to flow could be heating the material to above room temperature or cooling it below room temperature. Or it could include providing forces excessive of the earth's gravity. It could also include other deforming forces, such as tensile forces and combinations of these activation phenomena.

The term "deformable material" is intended to include foils, polymer sheets, cloth, wovens or nonwovens, paper, cellulose fiber sheets, co-extrusions, laminates, and combinations thereof. The properties of a selected deformable material can include, though are not restricted to, combinations or degrees of being: porous, non-porous, microporous, gas or liquid permeable, non-permeable, hydrophilic, hydrophobic, hydroscopic, oleophilic, oleophobic, high critical surface tension, low critical surface tension, surface pre-textured, elastically yieldable, plastically yieldable, electrically conductive, and electrically non-conductive. Exemplary materials include wood, metal, rigid polymer stock, ceramic, glass, cured resin, thermoset materials, cross-linked materials, rubber, frozen liquids, concrete, cement, stone, man-made materials, etc. Such materials can be homogeneous or composition combinations.

In a particularly preferred embodiment, protrusions 14 have an average base diameter of about 0.015 inches (0.038 cm) to about 0.030 inches (0.076 cm), and more preferably about 0.025 inches (0.064 cm). They also have an average center-to-center spacing of from 0.03 inches (0.08 cm) to 0.06 inches (0.15 cm), and more preferably about 0.05 inches (0.13 cm) spacing. This results in a high number density of protrusions. The more protrusions per unit area, the thinner the piece of material and protrusion walls can be in order to resist a given deformation force. In a preferred embodiment the number of protrusions per square inch exceeds 200 and the protrusions occupy from about 30% to about 70% of the protrusion side of the piece of material. They have a protrusion height of about 0.004 inches (0.010 cm) to 0.012 inches (0.030 cm), and more preferably about 0.006 inches (0.015 cm) height. The preferred material is 0.0003 inch (0.0076 mm) nominal thickness high density polyethylene (HDPE).

For fabrication of an adhesive-containing, three-dimensional, nesting-resistant sheet material, a preferred layer of substance 16 is preferably a latex pressure sensitive adhesive about 0.001 inch (0.025 mm) thick. Even more preferably, layer of substance 16 may be about 0.0005 inch (0.013 mm) thick layer to about 0.002 inch (0.051 mm) thick layer of hot melt adhesive, specification no. Fuller HL-2115X, made by H. B. Fuller Co. of Vadnais Heights, Minn. Any adhesive can be used which suits the needs of the material application. Adhesives may be refastenable, releasable, permanent, or otherwise. The size and spacing of protrusions is preferably selected to provide a continuous adhesive path surrounding protrusions so that air-tight seals may be made with a target surface.

Film materials may be made from homogeneous resins or blends thereof Single or multiple layers within the film structure are contemplated, whether co-extruded, extrusion-coated, laminated or combined by other known means. The key attribute of the film material is that it be formable to produce protrusions and valleys. Useful resins include polyethylene, polypropylene, PET, PVC, PVDC, latex structures, nylon, etc. Polyolefins are generally preferred due to their lower cost and ease of forming. Preferred material gauges are about 0.0001 inches (0.0025 mm) to about 0.010 inches (0.25 mm). More preferred gauges are from about 0.0002 inches (0.005 mm) to about 0.002 inches (0.051 mm). Even more preferred gauges are from about 0.0003 inches (0.0076 mm) to about 0.001 inches (0.025 mm).

Providing a film modulus of elasticity sufficiently high to minimize film stretch during use is beneficial to sealing material 10 to a target surface. Stretched film results in residual forces parallel to the plane of adhesive contact, which may cause a weak adhesive bond to break. The larger and more closely spaced the protrusions, the greater the likelihood of stretch occurring in a given film. Although elasticity in material 10 is believed to be undesirable for use as a container wrap which seals to a container, there are potentially many other uses for an elastic material containing a pattern of substance. Reducing the protrusion spacing to the closest possible spacing which is manufacturable may increase material stretch, but it may be beneficial in reducing the volume of substance between protrusions. Different applications for the formed material of the present invention will dictate ideal size and density of protrusions, as well as the selection of the substances used therewith.

The material property "beam strength" of the three-dimensional sheet material was mentioned above in terms of the beam strength preventing significant nesting of any region of material surrounding a given protrusion even in the event that that protrusion finds itself superimposed over a single matching or larger depression of compatible shape since the protrusions surrounding the single protrusion of interest will differ in size, shape, and spacing from those surrounding the other protrusion/depression. Beam strength is thus an important factor to consider when selecting the material type and thickness, as well as the density and pattern of protrusions. It has been observed that in general larger numbers of smaller protrusions provide a greater level of beam strength for a given material type and thickness than a smaller number of larger protrusions. Said differently, thinner and more conformable materials may be utilized and still realize the non-nesting advantages of the present invention through the use of an amorphous pattern having generally comparatively small, comparatively high number density protrusions.

It is believed that the protrusion size, shape and spacing, the web material properties such as flexural modulus, material stiffness, material thickness, hardness, deflection temperature as well as the forming process determine the strength of the protrusion. The forming process is important in polymer films for example, since "cold forming" or embossing generates residual stresses and different wall thickness distributions than that produced by thermoforming at elevated temperatures. For some applications it is desirable to provide a stiffness (deformation resistance) which is sufficient to withstand a pressure of at least 0.1 pounds per square inch (0.69 kPa) without substantially deforming protrusions to where the substance contacts an external surface. An example of this requirement would be the need to wind the web onto a roll for transport and/or dispensing. Even with very low in-wound pressures of 0.1 pounds per square inch (0.69 kPa), a residual in-wound pressure in the interior of the roll may deform protrusions in the web sufficiently to bring the overlaying web layers into contact with the substance. A "threshold" protrusion stiffness is required to prevent this winding damage from occurring. Similarly, when the web is stored or dispensed as discrete sheets, this "threshold" stiffness is required to prevent premature activation of the product due to the weight of overlaying layers of sheets or other forces, such as forces induced by shipping vibrations, mishandling, dropping and the like.

If the three dimensional structure of the present invention is used as a tape or a storage wrap, for example, the external contact surfaces may be either compliant or rigid and planar or non-planar. Having the three dimensional structure deform is preferred for use with a rigid target surface. If the substance is adhesive and the objective is releasable adherence to a target surface after deformation of the structure, then the degree of adhesion is important. For a storage wrap where releasability after adhesion is necessary, the peel strength of the adhesive is preferably measured by Pressure Sensitive Tape Council Method PSTC-1. A 12 inch (30.5 cm) long by 1 inch (2.5 cm) wide strip of film is rolled once against a smooth stainless steel surface at a rate of 12 inches (30.5 cm) per minute using a 4.5 pound (2.04 kg) roller and then tested as having a peak adhesion peel force value ranging from about 1 to about 50 ounces/inch (0.012 to 0.600 kg/cm), more preferably from about 1 to about 2.5 ounces/inch (0.012 to 0.027 kg/cm) of strip width.

Minimum adhesion which maintains a seal is desired for a storage wrap, so that the wrap is easily peeled open for access to the stored item(s). Inversion of protrusions, especially those made of HDPE, minimizes protrusion spring back so that higher adhesion isn't necessary in order to prevent the failure of relatively weak seals. In this embodiment it is desired that the protrusion remain "dead" or non-resilient after being inverted or crushed; however, a resilient protrusion could be used, for example, where it is intended for the bond to be permanent, where aggressive adhesive overcomes spring back. Also, a resilient protrusion may be desirable where repeat use of the material is intended.

Deformation mode and force can be influenced by the sidewall thickness profile to provide more desired results. A protrusion's sidewall connects the outermost portion of the protrusion to the unformed material adjacent to base perimeter of the protrusion. The sidewall as defined may also contain a peripheral region substantially within the outermost portion which is substantially thinner than the interior region of the outermost portion. Protrusions where at least a portion of the sidewalls are substantially thinner than the unformed material adjacent to the base perimeter are believed preferred for deformation by the user. Sidewalls that are also substantially thinner in at least a portion of the sidewall as compared to the material at the outermost portion of the protrusion also beneficially bias the deformation to occur primarily within the sidewall structure.

In structures containing relatively small protrusions, as found in high number density protrusion patterns, such thinner sidewall gauges can be particularly useful.

Protrusions 12 have sidewalls 22, which become thinned when protrusions 12 are formed, to help ensure that protrusions 12 deform as intended. High density polyethylene is preferred over low density polyethylene because the former can be made thinner for the same protrusion deform strength and because once deformed, HDPE protrusions do not tend to rebound toward their undeformed initial configuration as do the LDPE protrusions.

Protrusions 12 preferably have a convex polygonal base shape, the formation of which is described hereinafter. By convex polygonal shape, it is meant that the bases of the protrusions have multiple (three or more) linear sides, which form no externally measured angle of less than 180° with any adjacent side. Of course, alternative base shapes are equally useful. However, the preferred base shape is believed to be most easily generated. Polygons preferably interlock in the plane of the lower or female surface 17, as in a tessellation, to provide constant width spacing between them. The width A of spaces 14 may be selected depending upon the volume of substance desired between protrusions. Preferably width A is always less than the minimum protrusion dimension of any of plurality of protrusions 12. The area occupied by plurality of protrusions 12 is preferably from about 30% to about 70%, more preferably about 50%, of the available area of sheet of material 10, as measured parallel to plane 20.

FIGS. 10–13 disclose a suitable method and apparatus for making material 10, the method generally indicated as 30. Method 30 is representative and may be modified or tailored to suit a particular size, composition, etc. of the resulting material 10. Method 30 utilizes a forming surface 32, which is preferably a three-dimensional screen having recesses 34 and lands 36 between recesses 34. Such a forming structure or forming structure would constitute a female-type forming structure which, in use, would form corresponding male protrusions in the structure-contacting side of the formed material. Alternatively, forming surface 32 could comprise a three-dimensional forming structure of the male variety by having raised pins 34 of the desired polygonal shape having recesses 36 between and around the pins 34. In use, such a forming structure would form corresponding female depressions in the structure-contacting side of the formed material.

Figure 10:
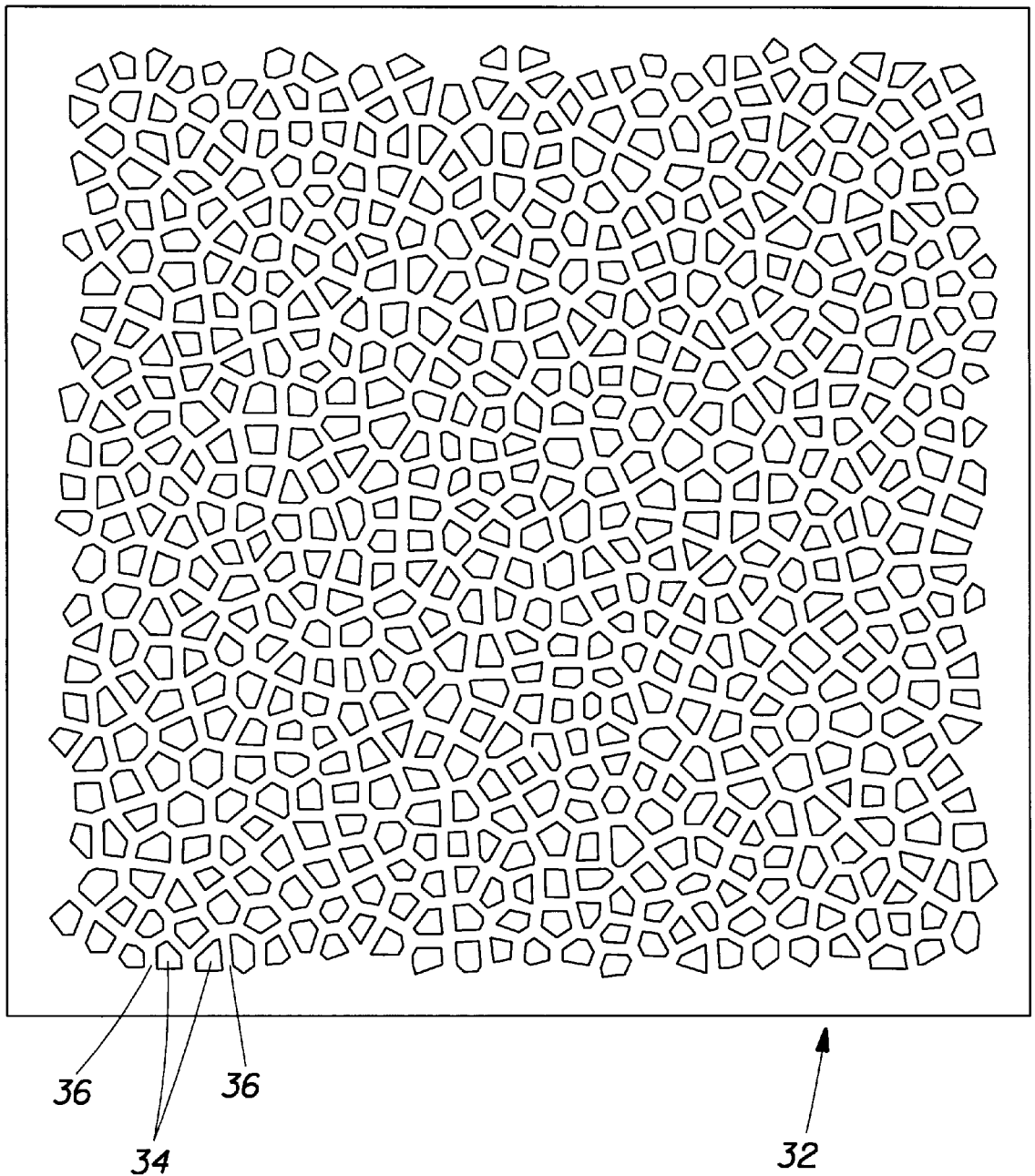
FIG. 10 is a plan view of a three-dimensional forming structure suitable for forming a three-dimensional, nesting-resistant sheet material such as that of FIG. 5.

More particularly, FIG. 10 depicts a forming surface which could be utilized to form a corresponding three-dimensional material 10 such as depicted in FIG. 5. When a material 10 is thermoformed over forming surface 32, protrusions 12 are preferably formed by drawing them into recesses 34 with vacuum when material 10 is heated to a softening temperature, and then maintaining protrusions 12 drawn into recesses 34 while material 10 cools to a solidification temperature. In this method, lands 36 define the bases of spaces 14 between protrusions 12. Protrusions 12 are preferably formed with sidewalls 22 being as nearly perpendicular to plane 20 as possible, but with some taper being typical. Outermost ends of protrusions 12 may domed or more truncated in shape so as to form frustums of the corresponding polygonal shape.

Material 10 may be vacuum thermoformed, embossed, or hydroformed, or formed by other forming means commonly known in the art for permanently deforming thin materials.

Figure 12:
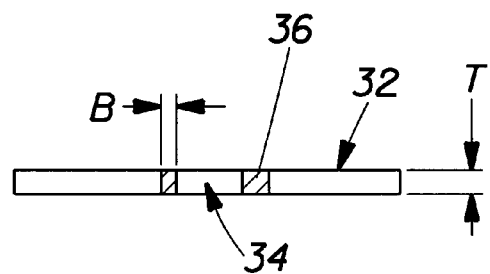
FIG. 12 is a partial elevational sectional view of the three-dimensional forming structure of FIG. 10.
Figure 13:
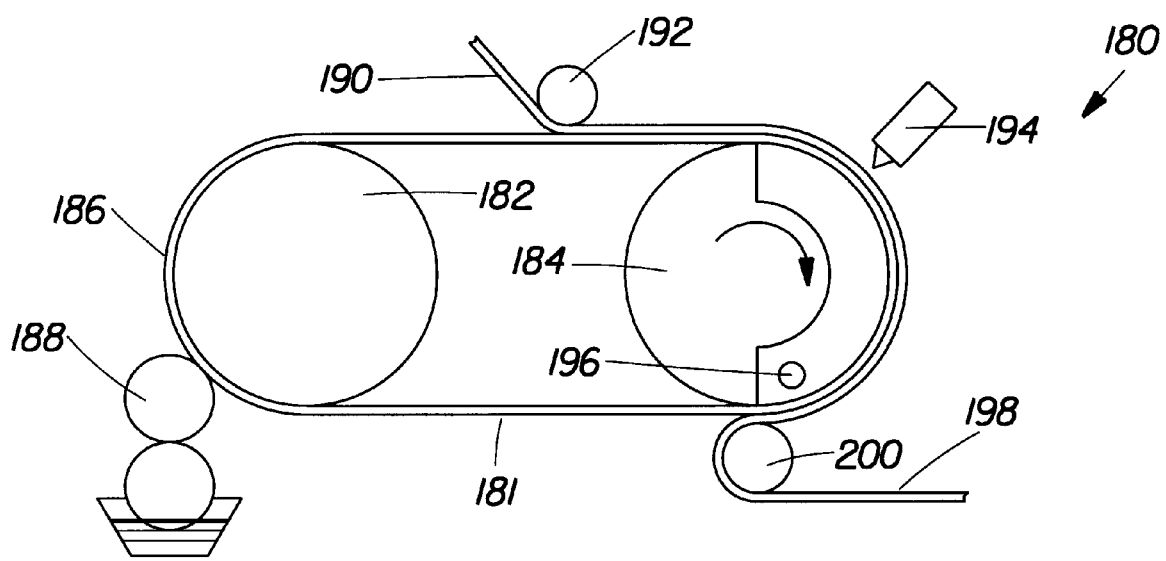
FIG. 13 is a schematic illustration of a representative apparatus suitable for forming a three-dimensional, nesting resistant sheet material in accordance with the present invention.

FIG. 10 shows a preferred forming screen 32 comprising interconnected lands 36 surrounding polygonal recesses 34. Lands 36 are preferably made of stainless steel and coated with a release agent. Most preferably, screen 32 is made into a continuous belt 38, as shown in FIG. 13. Alternatively, screen 32 could be utilized in flat plate-like form or formed into a rigid drum. FIG. 12 depicts a partial cross-sectional view of forming screen 32 taken at a location which depicts a cross-section through two consecutive lands. Lands 36 have a dimension B which represents the land width, which is preferably constant as measured between substantially parallel adjacent land edges, and a dimension T which represents screen thickness.

Figure 11:
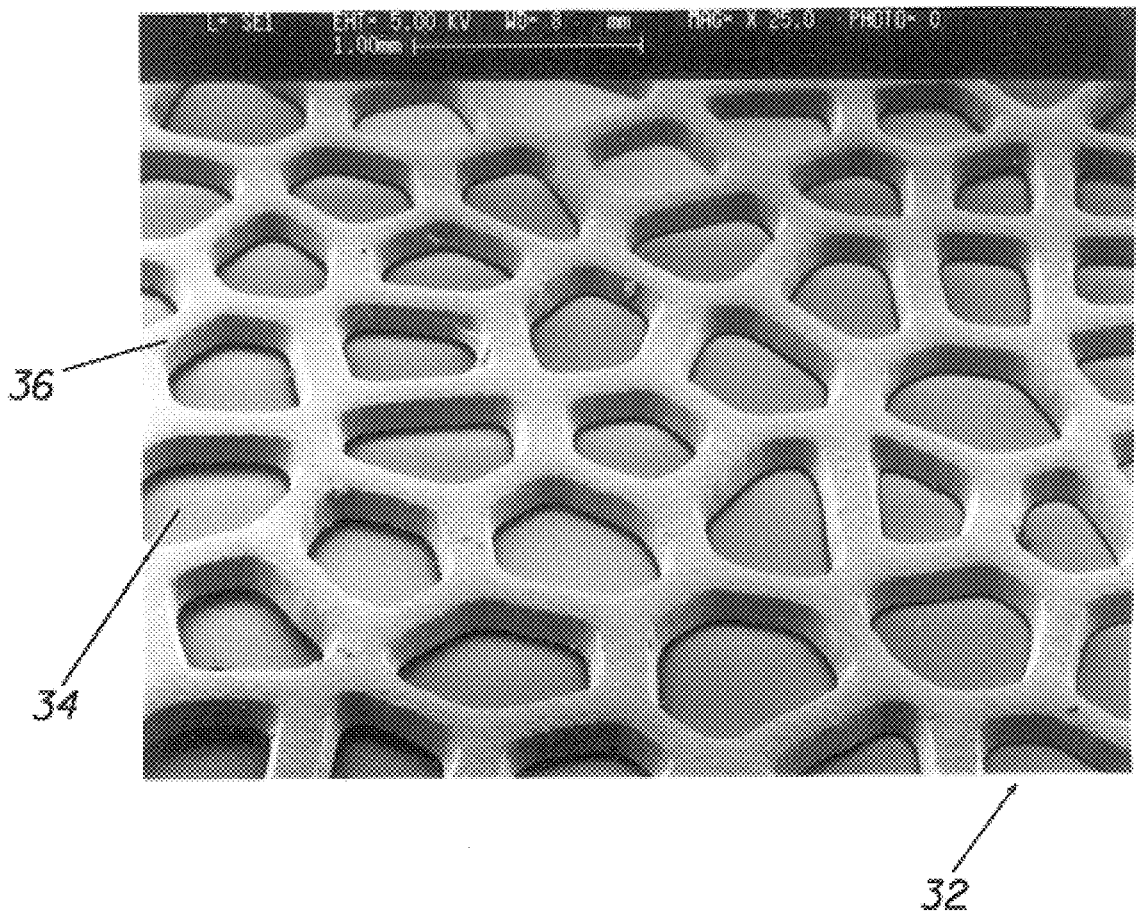
FIG. 11 is a photomicrograph depicting a perspective view of a representative three-dimensional forming structure suitable for forming a three-dimensional, nesting-resistant sheet material such as that of FIG. 1.

The amorphous pattern of the forming screen is preferably generated in accordance with the method described above. By way of example, FIG. 11 is a photomicrograph depicting a perspective view of a representative three-dimensional forming structure 32 having recesses 34 and lands 36 suitable for forming a three-dimensional, nesting-resistant sheet material such as that of FIG. 1.

Methods of production can influence the sidewall thickness profile such as in the use of a forming screen with essentially straight screen walls which define the forming screen hole. Such a process allows for substantially thinner sidewall thickness since the protrusion is freely drawn from the base perimeter into the forming screen recess to the point of contact with the internal backup screen. The internal backup screen's purpose is to prevent further drawing of the protrusion. This approach yields a more varied gauge profile within the sidewalls.

It has been discovered while reducing to practice the present invention that when using hot melt adhesive for the substance, thermoforming behaves differently than when other substances are processed. The difference is that protrusions, which are formed when hot melt adhesive has been applied to the forming surface, tend to exhibit more thinning in their sidewalls. It is believed that the hot melt adhesive cools and solidifies when contacting the metal forming surface and thereby prevents web material in contact with the adhesive from being drawn into the recesses, so that uniform thickness valleys result. With other substances, such as latex adhesive, less thinning of protrusion sidewalls occurs, presumably because some of the web material in contact with the adhesive on the lands or pin tops of the forming surface flows into the recesses during thermoforming.

FIG. 13 shows a suitable and presently preferred method and apparatus for making a material such as material 10 of the present invention, which is generally indicated as 180. The formed material is preferably transparent or translucent, so that it may be accurately positioned before being deformed. Transparency, however, introduces a new problem of determining on which side of the three-dimensional structure the substance is located, in order to know which side to place against a target surface. Substance side identification can be solved by placing indicia on the surface of the three dimensional structure, by coloring the substance a different tint than the three dimensional structure, or by providing a laminated material structure of different tints, for example. In the case of labels, transparency may not be needed since material edges may be used for proper positioning.

Micro-texturing the material during forming may also be useful, such as in producing a distinction between one side of the material and the other side. Micro-texturing of the outermost surface features of the three dimensional structure may be achieved in the present invention, for example, by drawing the piece of material into forming screen recesses and against a micro-textured surface, such as a vacuum drum having tiny apertures therein.

Forming screen 181 is threaded over idler pulley 182 and a driven vacuum roll 184. Forming screen 181 is preferably a 0.005 inch (0.013 cm) thick, 12.5 inch (31.8 cm) wide, 6 foot (183 cm) circumference stainless steel belt, having the desired protrusion pattern etched as recesses in the belt. Covering the outer surface of vacuum roll 184 is a 195 mesh seamless nickel screen having a diameter of 8.63 inches (21.9 cm), which serves as a porous backing surface for forming screen 181.

For producing a pressure sensitive adhesive containing material, a substance 186, preferably hot melt adhesive, is coated onto forming screen 181 by a substance applicator 188 while forming screen 181 travels at about 20 feet (610 cm) per minute. A material 190, for example, a HDPE film web about 0.0005 inches (0.0013 cm) thick, is brought into contact with the substance-coated forming screen at material infeed idler roll 192. Hot air at approximately 600° F. (316° C.) and flowing at approximately 11.25 SCFM (0.32 cubic meters/minute) is directed radially at material 190 by a hot air source 194 as the material passes over vacuum roll 184 and as vacuum is applied to forming screen 181 through vacuum roll 184 via fixed vacuum manifold 196 from a vacuum source (not shown). A vacuum of approximately 12 inches of mercury (40.6 kPa) is applied as the material is heated by hot air source 194. A formed, substance coated material 198 is stripped from forming screen 181 at stripping roll 200.

Stainless steel forming screen 181 is a fabricated, seamed belt. It is fabricated in several steps. The recess pattern is preferably developed by a computer program according to the method described above and is preferably printed onto a transparency to provide a photomask for photoetching. The photomask is used to create etched and non-etched areas. The etched material is typically stainless steel, but it may also be brass, aluminum, copper, magnesium, and other materials including alloys. Methods of making metal screens by photoetching are described in more detail in commonly owned U.S. Pat. Nos. 4,342,314 to Radel and Thompson, 4,508,256 to Radel et al., and 4,509,908 to Mullane, Jr., the disclosures of which are hereby incorporated herein by reference.

Additionally, the recess pattern may be etched into photosensitive polymers instead of metals. Examples are described along with a methods of making polymer forming screens in commonly owned U.S. Pat. Nos. 4,514,345 to Johnson et al., 5,098,522 to Smurkoski et al., 4,528,239 to Trokhan, and 5,245,025 to Trokhan, the disclosures of which are hereby incorporated herein by reference.

Next, the forming screen is converted into a continuous belt by butt welding the ends together, using either laser or electron beam welding. This produces a nearly undetectable seam, which is needed to minimize disruptions in the recess pattern. The final step is coating the endless belt with a low critical surface tension (non-stick) coating, such as a Series 21000 proprietary release coating made by and applied by Plasma Coatings of TN, Inc., located in Memphis, Tenn. It is believed that this coating is primarily an organo-silicone epoxy. As applied to a stainless steel forming screen used in the methods of the present invention, this coating provides a critical surface tension of about 18 dynes/cm. Other materials which may prove suitable for providing reduced critical surface tension include paraffins, silicones, PTFE's, and the like. This coating allows the formed material to be removed from the belt without undue stretching or tearing.

A belt forming screen is believed advantageous to a flat plate or a drum forming screen because a belt enables screen patterns and pattern lengths to be changed more easily and larger patterns may be used without having massive rotating members. However, depending upon the desired quantity and dimensions of the material 10 to be formed it may be equally suitable to fabricate the forming structure as a flat plate or rigid drum, and/or other forming structures and methods known in the art.

Because the same common forming screen is used to transfer the substance to the material as is used to form the protrusions, the substance pattern is conveniently registered with the protrusions. In the preferred embodiment, the top surface of forming screen 32 is continuous except for recesses 34; thus, the substance pattern is totally interconnected in this configuration. However, if a discontinuous pattern of substance were coated onto forming screen 32, a discontinuous substance pattern between protrusions would result.

In accordance with the preferred method of manufacturing the three-dimensional, nesting-resistant sheet material 10, the three-dimensional protrusions are unitarily formed from the sheet of deformable material itself and are hollow structures with depressions in one side which preferably each have a size and three-dimensional shape corresponding substantially with the size and three-dimensional shape of their respective protrusion. However, it may also be desirable for some applications to utilize solid protrusions unitarily, integrally, or separately formed from (and applied to) the sheet of material and which may or may not be deformable.

In general, the present invention is a three-dimensional, amorphous-patterned, nesting-resistant sheet material which is suitable for holding a substance protected from inadvertent contact with external surfaces. The sheet material of the present invention may be utilized as part of a structure which is convertible to a substantially two-dimensional structure by applying a compressive force so that the structure collapses to release or expose the substance into contact with external surface(s). However, the scope of the invention also applies to three-dimensional structures holding substances from inadvertent contact, which are converted to substantially two dimensional structures by means other than compression. For example, the inventors have found that a tensile force applied to the same three-dimensional structure can cause it to plastically deform longitudinally and thereby contract in caliper or thickness to similarly expose or release substance. It is believed that under sufficient tension, the material between protrusions deforms in response to forces in the plane of the material and that protrusions are thereby elongated in the same direction. When the protrusions are elongated, they are reduced in height. With enough elongation the protrusions are reduced in height to where the substances between them, in them, or both are exposed.

For a one inch wide strip of material 10, made from 0.0003 inch (0.0076 mm) thick HDPE and formed to have protrusions of 0.006 inches (0.152 mm) height and 0.030 inches (0.762 mm) diameter, spaced 0.045 inches (1.14 mm) apart, the tensile force found necessary to cause protrusions to expose a 0.001 inch (0.025 mm) thick coating of adhesive in the valleys between protrusions is approximately 0.80 pounds (0.36 kg) per inch of strip width.

A combination of compression and tensile forces may be applied to the material of the present invention in order to expose a substance from within the three-dimensional structure. Although in a preferred embodiment of the present invention, the tensile force necessary to achieve sufficient deformation of said three-dimensional structure in order to expose substance to an external surface is significantly greater than a compressive force to achieve the same result, a structure may be designed which is more easily deformed by a tensile force applied in a specific planar direction. Tensile responsive structures and the principles behind them are disclosed in commonly-assigned U.S. Pat. No. 5,518,801 to Chappell et al., the disclosure of which is hereby incorporated herein by reference.

In another example, heat could be applied to cause the same structure made of shrinkable film to reduce in thickness to similarly release or expose the substance.

Examples of uses of the three-dimensional sheet materials of the present invention besides tapes, labels, and storage wraps include: lotion impregnated facial tissues, scented strips containing microencapsulated perfumes, adhesive impregnated shelf and wall paper, medicinal patches, patterned condiment delivery to a surface, two component adhesives, laundry pre-treating chemicals, abrasive delivery systems, and other applications where avoidance of contact with a substance held in a substrate is desired until some action is taken. Alternative uses of a material having a three dimensional structure which may be converted to a two dimensional structure in order to expose a substance are described in more detail in the aforementioned and incorporated commonly-assigned, co-pending, concurrently-filed U.S. patent application Ser. No. 08/744,850 now U.S. Pat. No. 5,871,607, Attorney's Docket No. Case 5922R.

As described herein, different substances can be deposited on the opposing faces of the formed material. Multiple substances can be located on the same face of the material either geometrically spaced from each other or commingled. Substances can be partially layered. An example is a layer of adhesive adjacent to the material surface with a solid particulate adhered to the exposed side of the adhesive layer. In addition, it is contemplated that it may be desirable for certain applications to have protrusions extending outwardly from both sides of the formed material, such that both sides are active sides with deformable protrusions.

A pattern of protrusions can be superimposed either on a similar dimensional scale or on a different dimensional scale such as a single or multiple "microprotrusion" pattern located on the tops of other larger protrusions.

While much of the foregoing discussion has been focused on three-dimensional sheet materials containing a substance in addition to the material from which the sheet itself is formed, such as a pressure-sensitive adhesive, three-dimensional sheet materials containing no such additional substance are to be considered within the scope of the present invention. For example, a three-dimensional spacing sheet for use as a packaging wrap may be formed and utilized to fill voids within a shipping container such that an item enclosed therein may be essentially immobilized. Another example of such a three-dimensional sheet material is in the category of cleansing and cleaning implements such as wipes, cloths, sponges, pads, etc. The channels within the three-dimensional structure are employed to collect, imbibe, or scoop up dirt, solids, free liquids, or combinations thereof during cleaning and cleansing tasks. The amorphous pattern of channels or depressions provides for efficient cleaning due to some of the pattern's advantageous properties. This allows for effective cleaning irrespective of wiping direction and/or the chosen portion of the pattern which contacts the surface or item to be cleaned. A substance can be included in the three-dimensional sheet material before use which may deliver advantageous cleaning or cleansing properties.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A three-dimensional sheet material, said material having a first side and a second side, wherein said first side comprises at least one region having a plurality of spaced three-dimensional protrusions extending outwardly from said first side, said protrusions forming an amorphous pattern of two-dimensional geometrical shapes having a statistically-controlled degree of randomness.

2. The sheet material of claim 1, wherein said pattern includes a plurality of different two-dimensional geometrical shapes.

3. The sheet material of claim 1, wherein said protrusions are unitarily formed from said sheet material.

4. The sheet material of claim 1, wherein said second side comprises a plurality of spaced, three-dimensional hollow depressions corresponding to said protrusions, such that said protrusions are hollow.

5. The sheet material of claim 4, wherein the size and shape of each depression correspond substantially to the size and shape of each corresponding protrusion.

6. The sheet material of claim 1, wherein said sheet material exhibits isotropic structural web properties in any direction within the plane of said sheet material.

7. The sheet material of claim 1, wherein said sheet material is substantially isomorphic in geometrical and structural properties for a given circumscribed area throughout said pattern.

8. The sheet material of claim 1, wherein any single protrusion within said amorphous pattern has an equal probability of the nearest neighboring protrusion being located at any angular orientation with the plane of said material.

9. The sheet material of claim 1, wherein said plurality of protrusions in said amorphous pattern comprise interlocking convex polygons each having a finite number of substantially linear sides with facing sides of adjacent polygons being substantially parallel.

10. The sheet material of claim 1, wherein said sheet material is formed from an isotropic web of material and wherein said sheet material exhibits isotropic structural web properties in any direction within the plane of said sheet material.

11. The sheet material of claim 1, wherein said plurality of protrusions are separated by an interconnected network of three-dimensional spaces between adjacent protrusions.

12. The sheet material of claim 11, wherein said spaces have substantially equivalent widths throughout said pattern.

13. The sheet material of claim 12, wherein said spaces are partially filled with a substance.

14. The sheet material of claim 13, wherein said substance comprises an adhesive.

15. The sheet material of claim 1, wherein said depressions are partially filled with a substance.

16. The sheet material of claim 15, wherein said substance comprises an adhesive.

17. The sheet material of claim 1, wherein said protrusions occupy between about 30% and about 70% of the area of said first side of said sheet material, as measured parallel to a plane of said sheet material where said protrusions adjoin said first side.

18. A three-dimensional sheet material, said material having a first side and a second side, wherein said first side comprises at least one region having a plurality of spaced three-dimensional protrusions extending outwardly from said first side and unitarily formed from said sheet material, said protrusions forming an amorphous pattern of a plurality of different two-dimensional geometrical shapes having a statistically-controlled degree of randomness, and wherein said second side comprises a plurality of spaced, three-dimensional hollow depressions corresponding to said protrusions, such that said protrusions are hollow.

19. The sheet material of claim 18, wherein said plurality of protrusions are separated by an interconnected network of three-dimensional spaces between adjacent protrusions, said spaces having substantially equivalent widths throughout said pattern and being partially filled with an adhesive.

20. A method of making a three-dimensional sheet material, said method comprising the steps of:
 (a) introducing a sheet of formable material onto a three-dimensional forming structure having an amorphous pattern of three-dimensional shapes having a statistically-controlled degree of randomness; and
 (b) forming said sheet of material into compliance with said forming structure to generate a plurality of spaced, three-dimensional, protrusions extending outwardly from a first side of said sheet of material, said protrusions forming an amorphous pattern of two-dimensional geometrical shapes having a statistically-controlled degree of randomness.

21. The method of claim 20, wherein said plurality of protrusions are separated by an interconnected network of three-dimensional spaces between adjacent protrusions, and wherein said method further comprises the step of partially filling said spaces with a substance.

22. The method of claim 21, wherein said step of partially filling said spaces occurs substantially simultaneously with said step of forming said sheet of material.

23. The method of claim 22, wherein both of said substantially simultaneous steps are accomplished together on a common forming structure.

24. The method of claim 20, wherein said step of introducing said sheet of material onto said forming structure includes extruding said sheet of material onto said forming structure.

25. The method of claim 20, wherein said step of introducing said sheet of material onto said forming structure includes placing a preformed sheet of material onto said forming structure.

26. The method of claim 20, wherein said forming step is performed by a forming method selected from a group consisting of mechanical embossing, vacuum thermoforming, hydroforming, and combinations thereof.

27. The method of claim 20, wherein said forming structure comprises a continuous flexible belt.

28. The method of claim 20, wherein said forming structure comprises an amorphous pattern of three-dimensional recesses and interconnected lands.

29. The method of claim 28, wherein each of said recesses has a convex polygonal shape.

30. A method of making a three-dimensional sheet material, said method comprising the steps of:
 (a) generating a computer graphic having an amorphous two-dimensional pattern of interlocking two-dimensional geometrical shapes having a statistically-controlled degree of randomness, said pattern having lines of substantially constant width between said interlocking shapes;
 (b) transferring said amorphous two-dimensional pattern onto a forming structure to form a three-dimensional forming structure having three-dimensional recesses corresponding to said interlocking shapes and interconnected lands corresponding to said lines of substantially constant width;
 (c) optionally, coating said interconnected lands with a substance;
 (d) introducing a sheet of formable material onto said forming structure over said substance, said sheet of material having a greater affinity for said substance than said forming structure; and
 (e) forming said sheet of material into compliance with said forming structure to generate a plurality of spaced, three-dimensional, protrusions extending outwardly from a first side of said sheet of material, said protrusions forming an amorphous pattern of two-dimensional geometrical shapes having a statistically-controlled degree of randomness.

31. A method of making a forming structure, said method comprising the steps of:
 (a) generating a computer graphic having an amorphous two-dimensional pattern of interlocking two-dimensional geometrical shapes having a statistically-controlled degree of randomness, said pattern having lines of substantially constant width between said interlocking shapes;
 (b) transferring said amorphous two-dimensional pattern onto a forming structure to form a three-dimensional forming structure with three-dimensional shapes corresponding to said interlocking two-dimensional shapes.

32. The method of claim 31, wherein said transforming step forms a three-dimensional forming structure having three-dimensional recesses corresponding to said interlocking shapes and interconnected lands corresponding to said lines of substantially constant width.

33. The method of claim 31, wherein said amorphous pattern of interlocking shapes is derived from a constrained Voronoi tessellation of 2-space.

34. The method of claim 33, wherein said tessellation is constrained by a constraint factor which controls the range of permissible center-to-center spacing of said shapes.

35. A three-dimensional forming structure, said forming structure comprising an amorphous pattern of spaced three-dimensional recesses separated by interconnected lands, wherein said recesses form an amorphous two-dimensional pattern of interlocking two-dimensional geometrical shapes having a statistically-controlled degree of randomness.

36. The forming structure of claim 35, wherein said lands between said recesses exhibit a constant width.

37. The forming structure of claim 35, wherein said forming structure comprises an endless flexible belt.

38. The forming structure of claim 37, wherein said endless flexible belt is formed of a polymeric material.

39. The forming structure of claim 37, wherein said endless flexible belt is formed of stainless steel.

40. The forming structure of claim 35, wherein said forming structure comprises a rigid forming screen.

* * * * *